United States Patent
Shimada et al.

(10) Patent No.: US 6,396,919 B1
(45) Date of Patent: May 28, 2002

(54) TELEPHONE TRANSACTION SUPPORT SYSTEM AND TELEPHONE CALL CONNECTION CONTROL SYSTEM

(75) Inventors: Takashi Shimada; Kiyofumi Akita; Shigeru Idei, all of Kawasaki (JP)

(73) Assignees: Fujitsu Limited, Kawasaki; Animo Limited, Yokohama, both of (JP)

( * ) Notice: Subject to any disclaimer, the term of this patent is extended or adjusted under 35 U.S.C. 154(b) by 0 days.

(21) Appl. No.: 08/825,677

(22) Filed: Mar. 20, 1997

(30) Foreign Application Priority Data

Jun. 14, 1996 (JP) .............................. 8-154502
Jun. 14, 1996 (JP) .............................. 8-154501

(51) Int. Cl.$^7$ ..................... H04M 11/00; H04M 3/42; H04M 3/00
(52) U.S. Cl. .............................. 379/265.12; 379/93.12; 379/201.01; 379/218.01; 379/265.05; 379/266.01
(58) Field of Search .......................... 379/67.1, 68, 72, 379/76, 85, 88.01, 88.02, 88.09, 88.11, 88.27, 91.01, 93.01, 93.03, 93.12, 265.01–265.14, 266.01–266.1, 201.01, 201.02, 201.11, 218.01, 218.02

(56) References Cited

U.S. PATENT DOCUMENTS

| | | | |
|---|---|---|---|
| 3,896,266 A | * 7/1975 | Waterbury ............... 379/91.01 |
| 4,757,525 A | * 7/1988 | Matthews et al. ............. 379/88 |
| 5,136,633 A | * 8/1992 | Tejada et al. ................. 379/91 |
| 5,313,556 A | * 5/1994 | Parra ......................... 395/2.55 |
| 5,345,501 A | * 9/1994 | Shelton ........................ 379/89 |
| 5,371,797 A | * 12/1994 | Bocinsky, Jr. ............... 380/24 |
| 5,533,102 A | 7/1996 | Robinson et al. ............. 379/67 |
| 5,533,103 A | 7/1996 | Peavey et al. ................ 379/69 |
| 5,590,038 A | * 12/1996 | Pitroda ........................ 395/241 |
| 5,594,791 A | 1/1997 | Szlam et al. ........... 379/265.09 |
| 5,703,943 A | * 12/1997 | Otto ........................... 379/265 |
| 5,757,904 A | * 5/1998 | Anderson ..................... 379/265 |
| 5,794,218 A | * 8/1998 | Jennings et al. ............... 705/35 |
| 5,825,856 A | * 10/1998 | Porter et al. ............. 379/93.12 |
| 5,910,047 A | * 6/1999 | Scagnelli et al. ............. 463/17 |
| 6,188,751 B1 | * 2/2001 | Scherer .................... 379/88.22 |

FOREIGN PATENT DOCUMENTS

| | | |
|---|---|---|
| EP | 0 426 361 | 5/1991 |
| EP | 0 454 363 | 10/1991 |
| EP | 0 675 625 | 10/1995 |
| EP | 0 768 788 | 10/1995 |
| GB | 2 273 025 | 6/1994 |
| GB | 2 287 609 | 9/1995 |
| WO | 92/17975 | 10/1992 |
| WO | 93/13518 | 7/1993 |

OTHER PUBLICATIONS

Search Report for U.K. patent application GB 0024322.0 dated Oct. 17, 2000.

* cited by examiner

*Primary Examiner*—Allan Hoosain
(74) *Attorney, Agent, or Firm*—Staas & Halsey LLP

(57) ABSTRACT

A telephone transaction support system includes a customer information registration unit for registering information regarding a customer in a database, the information being obtained in a conversation with the customer over a telephone, a feature analyzing unit for analyzing a feature of a voice corresponding to a predetermined word obtained in the conversation with the customer over the telephone, and a password information registration unit for registering information obtained by the feature analyzing unit as password information in the database, the password information corresponding to the customer in the database. The information regarding the customer for which a transaction over the telephone should be allowed and the password information for the customer can be registered over the telephone.

15 Claims, 21 Drawing Sheets

FIG.5

```
                INPUT CUSTOMER
                RETRIEVAL CONDITION
   TEL
   NAME
   CUSTOMER NO.
```

FIG.6

```
                    CUSTOMER INFORMATION
   ┌ CUSTOMER BASIC INFORMATION ZONE ─────────────────┐
   │                                                  │
   └──────────────────────────────────────────────────┘
   ┌ ICON ZONE ──────────────────┐   ┌ SCRIPT ZONE ──┐
   │                             │   │               │
   └─────────────────────────────┘   │               │
   ┌ TRANSACTION DETAILED INFORMATION│               │
   │ ZONE                            │               │
   │                             │   │               │
   └─────────────────────────────┘   └───────────────┘
```

FIG. 7

CUSTOMER BASIC INFORMATION RECORD

| CUSTOMER NO. | NAME | TEL NO. | |
|---|---|---|---|
| 00000001 | A | xxxx-xx-xxxx | ... |
| 00000002 | xxx | xxxx-xx-xxxx | ... |

PASSWORD (VOICE) FILE $\underline{00000001}$ . FFT
CUSTOMER NO. / FIXED $\underline{00000002}$ . FFT

CORRESPONDING

FIG. 10

TELEPHONE BANKING ADMISSION APPLICATION

DATE  19XX Y XX M XX D

| NAME | XXX XX | | |
|---|---|---|---|
| ADDRESS | 〒XXX-XX<br>XXX           XXX<br>XXXXXX XXXXXXXXXXXXXXX | | |
| TEL | (XXX)XX-XXXX EXT.(XXXX) | PASSWORD | XXXX |
| BIRTH DAY | XX Y XX M XX D | SEX | 1 MALE  2 FEMALE |
| FAMILY | | | ......... |
| RESIDENCE | 1. A   2. B   3. C  ..... 9 OTHER | | |
| | . | | |

EMPLOYMENT

| NAME | XXXXXXX | | |
|---|---|---|---|
| ADDRESS | 〒XXX XX<br>XXX           XXX<br>XXXXX XXXXXXXXXXXX XXXX XX | | |
| POSITION | XXX DIVISION XXX SECTION | TEL | (XXXX)XX-XXXX EXT.(XXXX) |
| TYPE | 1. A   2. B   3. C   4. OTHER | | |
| CAPITAL | 1. LESS THAN   NOT LESS THAN<br>   10 MILLION  2. 10 MILLION ............ 9. OTHER | | |
| EMPLOYEE NUMBERS | 1. LESS THAN 10  2. NOT LESS THAN 10 ........ 9. OTHER | | |
| POST | 1. A   2. B   3. C   4. D  ............ 9. OTHER | | |
| INCOME | SALARY | OTHER | |
| | . | | |

| DESTINATION FOR CHARGE PARTICULARS OF CARD | 1. RESIDENCE  2. EMPLOYMENT | | |
|---|---|---|---|
| BANK | | ACCOUNT NO. | |

| SIGNATURE | |
|---|---|

FIG. 17

| | | APPROVAL LIST | | | |
|---|---|---|---|---|---|
| TRANSACTION NO. | TRANSACTION | AMOUNT | OPERATOR NAME | · · · · · · | STATE |
| 00000010 | TRANSFER | 1,000,000 | A | · · · · · | NOT APPROVAL |
| 00000011 | XXX | XXX,XXX,XXX | XX | · · · · · | NOT APPROVAL |
| 00000012 | XXX | XXX,XXX,XXX | XX | · · · · · | NOT APPROVAL |
| 00000013 | XXX | XXX,XXX,XXX | XXX | · · · · · | NOT APPROVAL |

FIG. 18

```
                    APPROVING PROCESS

TRANSACTION NO.   00000010
TRANSACTION       TRANSFER
AMOUNT                1,000,000
OPERATOR          A
      :
      :
[ REPRODUCING CONVERSATION ]
```

FIG.22

| OPERATOR CODE | EXTENSION | VOICEPRINT DATA |
|---|---|---|
| xxxxxxx | xxxx | BINARY DATA |

FIG. 23

| CONTRACT NO. | CALL NO. | CONGENIAL OPERATOR A | | CONGENIAL OPERATOR B | | ... | CONGENIAL OPERATOR E | |
|---|---|---|---|---|---|---|---|---|
| | | OPERATOR CODE | EXTENSION | OPERATOR CODE | EXTENSION | | OPERATOR CODE | EXTENSION |
| xxxxxxx | xx-xxx-xxxx | xxxxxxxx | xxxx | xxxxxxxx | xxxx | | xxxxxxx | xxxx |

TELEPHONE TRANSACTION SUPPORT SYSTEM AND TELEPHONE CALL CONNECTION CONTROL SYSTEM

BACKGROUND OF THE INVENTION (1) Field of the Invention

The present invention generally relates to a telephone transaction support system used for various transactions (such as banking transactions) over telephones, and more particularly to a telephone transaction support system which processes information obtained in conversations with customers over telephones. In addition, the present invention also relates to a telephone call connection control system by which a call from a customer is connected to a telephone of an operator who is selected as a congenial operator to the customer from among a plurality of operators.

(2) Description of the Related Art

In recent years, banking transactions (e.g., transactions of transfer, deposit, withdrawal and balance inquiry) over telephones have been proposed.

In such banking transactions over the telephones, there are many problems, such as how to register customers permitted to access banking transactions over the telephones (registration of customer's information, registration of a password of a customer and the like), how to supply documents, such as applications and contract documents to customers, how to confirm whether a customer is permitted to make telephone transactions, how to confirm the contents of a transaction after receiving the contents of the transaction over the telephone (hereinafter referred to as a telephone transaction) and the like.

In addition, in enterprises, such as banks, a plurality of operators talk with customers over telephones for service assistance and reception of transactions. An exchange control for the telephones is carried out so that a call from a customer is connected to a telephone of one of the plurality of operators. In a conventional system, an automatic call distribution (ACD) unit is provided with an exchange unit, so that calls from customers are substantially uniformly distributed to the operators. Thus, the services of assistance and reception of transactions are prevented from being concentrated on a few operators.

However, calls from customers are only uniformly distributed to the operators without regard to relationships between the customers and the operators. Thus, a call from a customer may be connected to a telephone of an operator who is not congenial with that customer.

SUMMARY OF THE INVENTION

Accordingly, a general object of the present invention is to provide a novel and useful telephone transaction support system and a telephone call connection control system in which the disadvantages of the aforementioned prior art are eliminated.

A first object of the present invention is to provide a telephone transaction support system by which information of customers and passwords identifying customers can be registered in the system over the telephones without documents.

The above object of the present invention is achieved by a telephone transaction support system comprising: customer information registration means for registering information regarding a customer in a database, the information being obtained in a conversation with the customer over a telephone; feature analyzing means for analyzing a feature of a voice corresponding to a predetermined word obtained in the conversation with the customer over the telephone; and password information registration means for registering information obtained by the feature analyzing means as password information in the database, the password information corresponding to the customer in the database.

According to the above telephone transaction support system, the information regarding the customer for which a transaction over the telephone should be allowed and the password information for the customer can be registered over the telephone.

A second object of the present invention is to provide a telephone transaction support system by which documents, such as a contract document and an admission application, related to a transaction over a telephone can be issued in a convenient manner for the customer.

The above object of the present invention is achieved by a telephone transaction support system comprising: customer information registration means for registering information regarding a customer in a database, the information being obtained in a conversation with the customer over a telephone; retrieval means for retrieving information regarding the customer who wants to make a contract for a transaction over a telephone from the information in the database; and print means for printing necessary items regarding the customer on a predetermined sheet related to the telephone transaction based on the information retrieved by the retrieval means.

According to the above telephone transaction support system, the necessary items regarding the customer are printed on the predetermined sheet such as a contract document and an admission application. It is not necessary for the customer to enter the necessary items regarding the customer into the predetermined sheet. Thus, the documents, such as a contract document and an admission application, related to a telephone transaction can be issued in a convenient manner for the customer.

A third object of the present invention is to provide a telephone transaction support system which positively confirms whether the telephone transaction has been allowed for the customer, based on information obtained in the telephone conversation with the customer.

The above object of the preset invention is achieved by a telephone transaction support system comprising: feature analyzing means for analyzing a feature of a voice corresponding to a predetermined word obtained in a telephone conversation with a customer; a database in which information obtained by the feature analyzing means is stored as password information, the password information corresponds to the customer in the database; and checking means for checking an analyzing result obtained by the analyzing means which analyzes a feature of a voice corresponding to the predetermined word obtained in a telephone conversation with a customer before a transaction is performed against the password information stored in the database corresponding to the customer.

According to the above telephone transaction support system, the transaction with the customer is allowed when the analyzing result corresponding to the password information is obtained by checking means before starting the transaction. Thus, based on information obtained in the telephone conversation with a customer, it can be positively confirmed whether the telephone transaction has been allowed for the customer.

A fourth object of the present invention is to provide a telephone transaction support system by which a user of the system can be informed of information regarding a customer in a telephone conversation with the customer as soon as possible.

The above object of the present invention is achieved by a telephone transaction support system comprising: customer information registration means for registering information regarding a customer in a database, the information being obtained in a telephone conversation with the customer; means for inputting information identifying the customer; retrieval means for retrieving information regarding the customer based on the input information identifying the customer from the database; and display means for displaying the information retrieved by the retrieval means.

According to the above telephone transaction support system, the information regarding the customer is displayed by the display means. The user looks at the information regarding the customer, so that the user has knowledge of the customer in the telephone conversation with the customer.

A fifth object of the present invention is to provide a telephone transaction support system in which the contents of a transaction requested by a customer over a telephone can always be confirmed.

The above object of the present invention is achieved by a telephone transaction support system comprising: transaction registration means for registering contents of a transaction in a database, the contents of the transaction being requested by a customer over a telephone; and conversation recording means for recording contents of transaction in a telephone conversation with the customer in the database, the recorded contents of the conversation corresponding to the transaction in the database.

According to the above telephone transaction support system, it can be checked whether the contents of the transaction registered in the database corresponds to the contents of the conversation recorded in the database. Thus, based on the checking results, it can be always confirmed whether the registered contents of the transaction is correct.

The fifth object of the present invention is also achieved by a telephone transaction support system comprising: a database in which contents of a telephone transaction requested by a customer and contents of a conversation with the customer in the telephone transaction, the contents of the conversation corresponding to the transaction in the database; transaction specifying means for specifying a transaction; reading out means for reading out the contents of the transaction specified by the transaction specifying means from the database; first output means for outputting the contents of the transaction read out from the database by the reading out means; conversation reading out means for reading out the contents of the conversation corresponding to the transaction from the database; and second output means for outputting the contents of the transaction read out from the database by the conversation reading out means.

According to the above telephone transaction support system, the user can compare the contents of the transaction output by the first output means with the contents of the conversation output by the second means. Thus, it can be always confirmed, based on the comparison result, whether the registered contents of the transaction is correct.

A sixth object of the present invention is to provide a telephone call connection control system by which a call from a customer can be connected to a telephone of an operator, from among a plurality of operators, who is congenial to the customer.

The above object of the present invention is achieved by a telephone call connection control system comprising: a voice feature database in which voice feature data items representing features of voices of a plurality of operators are stored; feature analyzing means for analyzing a feature of a voice corresponding to a predetermined word obtained from a customer over a telephone; operator selecting means for comparing data regarding the feature of the voice of the customer obtained by the feature analyzing means with voice feature data items of the respective operators in the voice feature database, and for selecting an operator corresponding to a voice feature data item which has a predetermined relationship to the data regarding the feature of the voice of the customer; and connection control means for connecting a call from the customer to a telephone of the operator selected by the operator selecting means.

It is known that general character of a person can be judged based on a feature of a voice of the person (see Japanese Laid Open Patent Application No.7-102631). Thus, it is determined, based on features of voices of a customer and operators, whether the operators are congenial to the customer. Based on the determination result, an operator who is congenial to the customer is selected from among a plurality of operators. A call from the customer is then connected to a telephone of the selected operator.

The above sixth object of the present invention is also achieved by a telephone call connection control system comprising: a response operator database in which relationships between customers and operators congenial to the respective customers are stored; retrieval means for retrieving information of an operator who is congenial to a customer calling the system; and connection control means for connecting a call from the customer to a telephone of the operator selected by the retrieval means.

According to the above telephone call connection control system, an operator who is recorded as a congenial operator to the customer in the response operator database is selected. A call from the customer is connected to a telephone of the selected operator.

Further, the above sixth object of the present invention is achieved by a telephone call connection control system comprising: a voice feature database in which voice feature data items representing features of voices of a plurality of operators are stored; feature analyzing means for analyzing a feature of a voice corresponding to a predetermined word obtained from a customer over a telephone; operator selecting means for comparing data regarding the feature of the voice of the customer obtained by the feature analyzing means with voice feature data items of the respective operators in the voice feature database, and for selecting an operator corresponding to a voice feature data item which has a predetermined relationship to the data regarding the feature of the voice of the customer; response operator registration means for registering the operator selected by the operator selecting means in a response operator database, the operator corresponding to the customer in the response operator database; retrieval means for retrieving information of an operator who is congenial to a customer calling the system; and connection control means for connecting a call from the customer to a telephone of the operator selected by the retrieval means.

BRIEF DESCRIPTION OF THE DRAWINGS

Other objects, features and advantages of the present invention will be apparent from the following description when read in conjunction with the accompanying drawings, in which:

FIG. 5 is a diagram illustrating an example of a window used to input retrieval conditions for a customer;

FIG. 6 is a diagram illustrating an example of a display screen for customer information;

FIG. 7 is a diagram illustrating relationships between a customer basic information record and password files for the customer;

FIG. 10 is a diagram illustrating an example of an admission application of a telephone banking transaction;

FIG. 17 is a diagram illustrating an example of a display screen on which an approval list is indicated;

FIG. 18 is a diagram illustrating an example of a display screen for the approving process;

FIG. 22 is a diagram illustrating an example of an operator information record; and FIG. 23 is a diagram illustrating an example of a congenial operator information record.

DESCRIPTION OF THE PREFERRED EMBODIMENTS

A description will be given, with reference to the drawings, of embodiments of the present invention.

Figure 1:
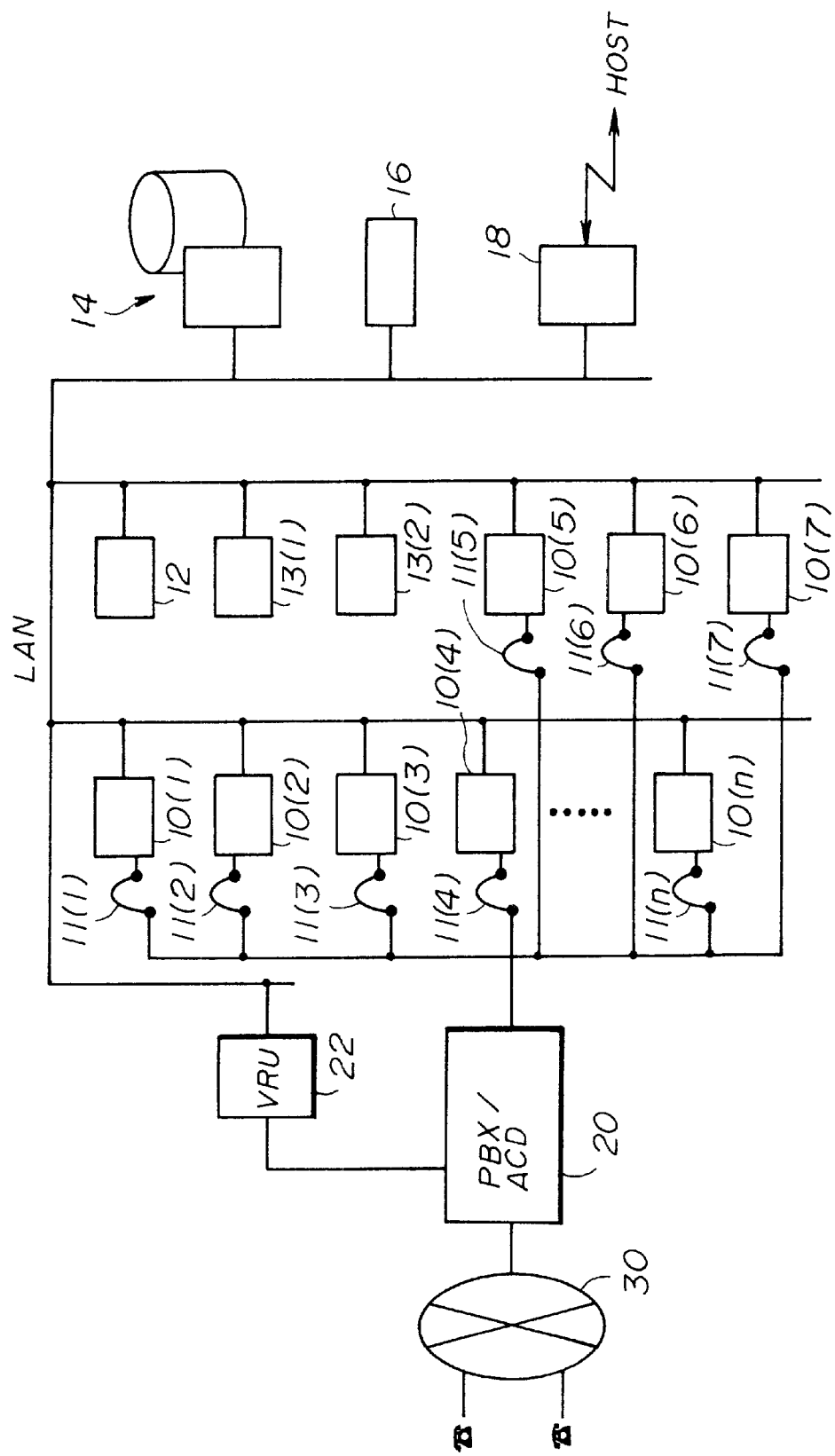
FIG. 1 is a block diagram illustrating a hardware structure of a telephone transaction support system according to an embodiment of the present invention.

A telephone transaction support system according to a first embodiment of the present invention is formed as shown in FIG. 1. Banking transactions can be performed over telephones (telephone banking transactions) using this telephone transaction support system.

Referring to FIG. 1, a plurality of client terminals 10(1), 10(2), . . . , 10(n), 12, 13(1) and 13(2) are connected to a LAN. Each of the client terminals 10(1), 10(2), . . . , and 10(n) is a terminal for reception of a telephone transaction and referred to as a reception terminal. The client terminal 12 is a terminal for monitoring the system and referred to as a monitoring terminal. Each of the client terminals 13(1) and 13(2) is a terminal for approval of a banking transaction received over the telephone by each of the reception terminals 10(1), 10(2), and 10(n) and is referred to as an approval terminal.

Further, a database server 14, a printer unit 16, a communication server 18 and a voice response unit (VRU) 22 are connected to the LAN. The database server 14 manages files shared in the system. The printer unit 16 can be accessed by the respective client terminals and database server 14 and prints transaction journals, forms, contract documents and the like. The communication server 18 is coupled to a host computer of a bank and transmits to the host computer contents of transactions which have been approved in the system. The voice response unit 22 has the same functions as each of the reception terminals 10(1), 10(2), . . . , and 10(n) and performs a process for transactions over the telephone with customers using an automatic response function.

An exchange (PBX/ACD) 20 connected to a public network 30 is connected with the respective reception terminals 10(1), 10(2), . . . , and 10(n) and the voice response unit 22. The exchange 20 connects calls from external telephones to the voice response unit 22 in principle. The exchange 20 has an automatic call distribution (ACD) function, so that calls from the external telephones are distributed among the reception terminals 10(1), 10(2), . . . and 10(n) in accordance with a predetermined algorithm.

When a call is connected to the voice response unit 22, the voice response unit 22 responds to the call with a voice in accordance with a predetermined procedure. Each of the reception terminals 10(1), 10(2), . . . and 10(n) has a telephone communicating function. An operator of each of the reception terminals 10(1), 10(2), . . . and 10(n) talks with a customer using a corresponding one of telephone head-sets 11(1), 11(2), . . . and 11(n).

Figure 2:
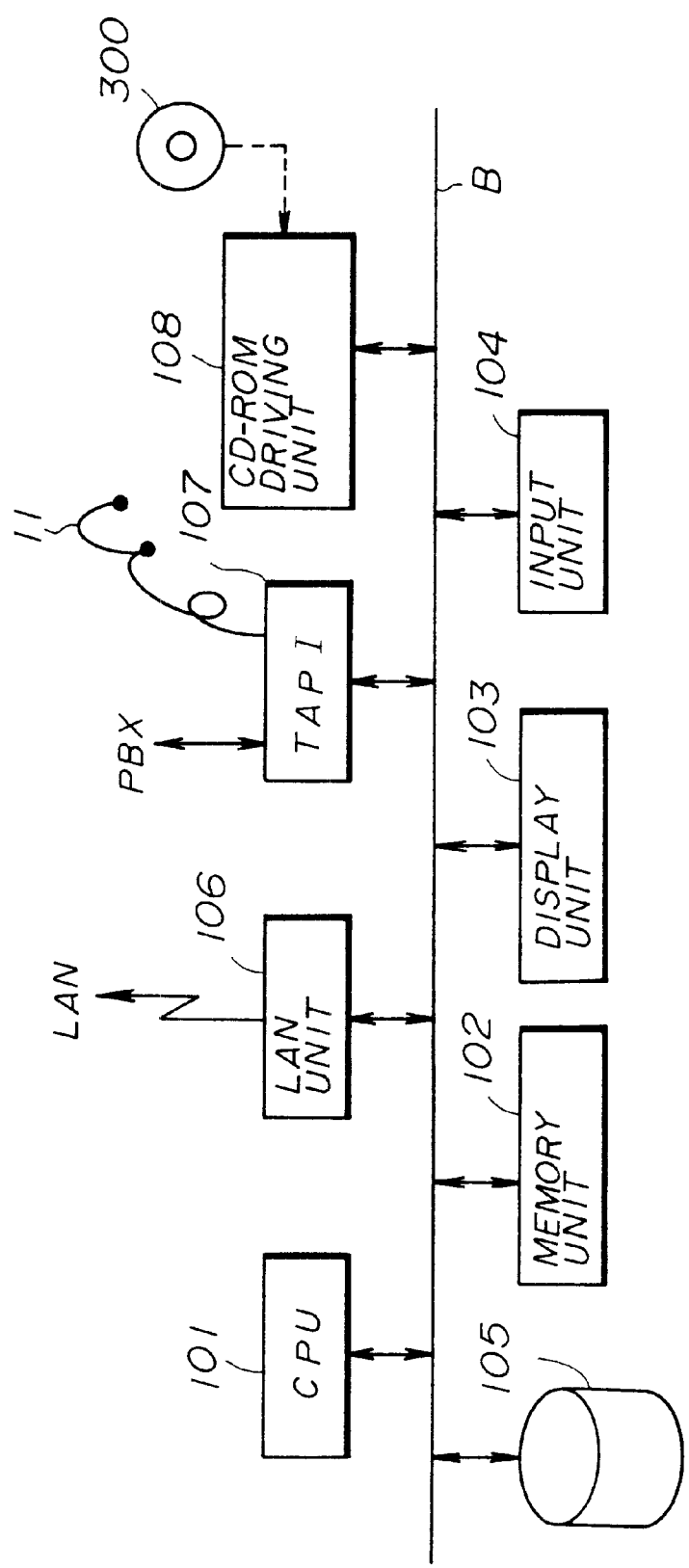
FIG. 2 is a block diagram illustrating a hardware structure of a reception terminal included in the system shown in FIG. 1.

Each of the reception terminals 10(1), 10(2), . . . and 10(n) is formed as shown in FIG. 2.

Referring to FIG. 2, a reception terminal has a control unit 101 including a CPU, a memory unit 102, a display unit 103, an input unit 104, a disc unit 105, a LAN unit 106, an internal telephone unit 107 and a CD-ROM driving unit 108. These units are connected to each other by a system bus B.

The control unit 101 controls the reception terminal and executes a process for the reception of transactions over the internal telephone unit 107. The memory unit 102 includes memories such as a ROM (Read Only Memory) and a RAM (Random Access Memory) and stores programs which are to be executed by the control unit 101 and data obtained in the processes. The display unit 103 has a CRT or an LCD (Liquid Crystal Display panel). Various kinds of guidances and scripts for the operator and information of customers are displayed on the display unit 103. The input unit 104 has a keyboard and a mouse and is used by the operator to input information to the reception terminal.

The LAN unit 106 is connected to the LAN and communicates with the LAN. The internal telephone unit (TAPI) 107 is connected to the exchange 20 (PBX/ACD). Voice communication is performed between the internal telephone unit 107 and the exchange 20. The telephone head-set 11 is connected to the internal telephone unit 107, and the operator talks with a customer using the telephone head-set 11.

A CD-ROM 300 stores a program comprising program codes representing the process for the reception of the telephone transaction. The process for the reception of the telephone transaction includes a registration process for customers and a reception process for transactions which will be described later.

The program is installed from the CD-ROM 300 set in the CD-ROM driving unit 108 to the disc unit 105. When the reception terminal is turned on, the program read out of the disc unit 105 is stored in the memory unit 102. In this state, the control unit 101 (CPU) executes the process for the reception of transactions in accordance with the program.

The voice response unit 22 has also has the same structure as a normal computer terminal. The voice response unit 22 is provided with the same program as the reception terminal. Thus, the voice response unit 22 has the same function as the reception terminal.

Figure 3:
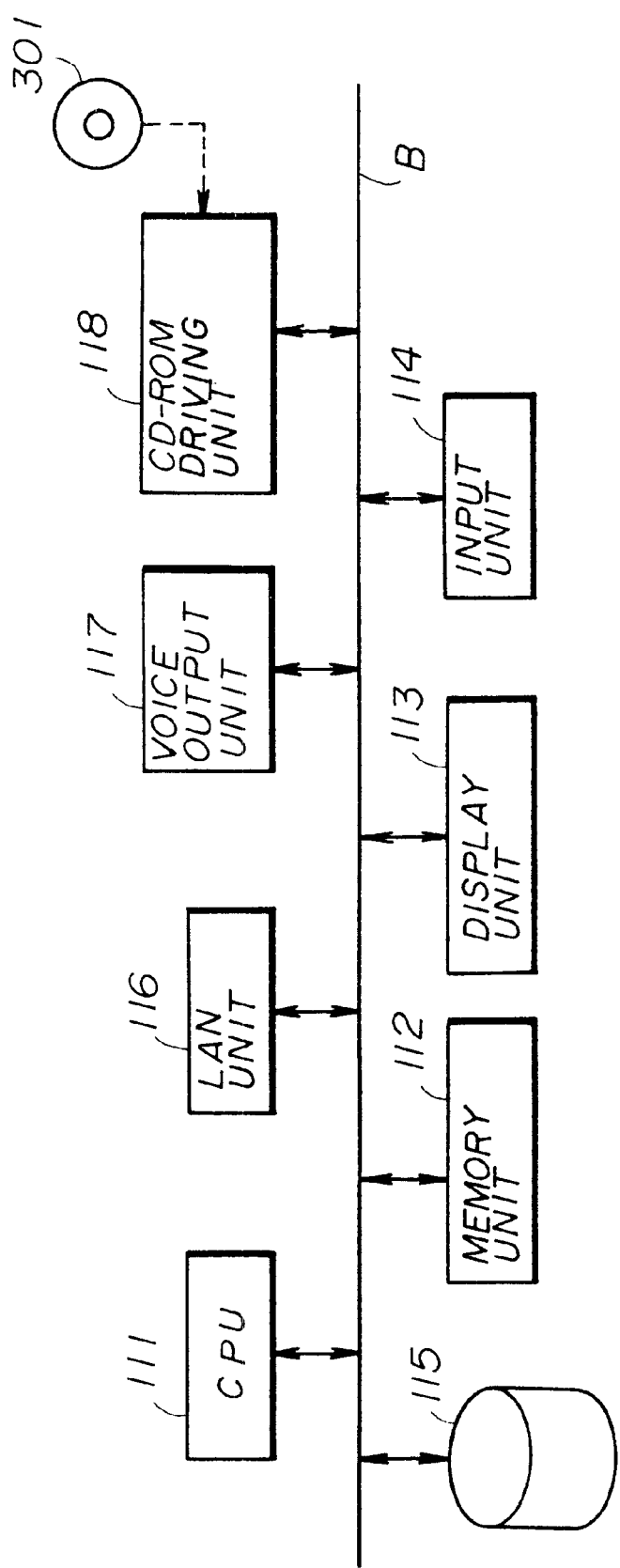
FIG. 3 is a block diagram illustrating a hardware structure of an approval terminal included in the system shown in FIG. 1.

Each of the approval terminals 13(1) and 13(2) is formed as shown in FIG. 3.

Referring to FIG. 3, an approval terminal has a control unit 111 (CPU), a memory unit 112, a display unit 114, a disc unit 115, a LAN unit 116 and a CD-ROM driving unit 118 all of which are connected to a system bus B, in the same manner as the reception terminal described above. The approval terminal further has a voice output unit 117 connected to the system bus B. The voice output unit 117 has a loudspeaker and outputs voice conversation information.

A CD-ROM 301 stores a program comprising program codes representing a process for approval of transactions. The program is installed from the CD-ROM 301 set in the CD-ROM driving unit 118 to the disc unit 115. The program which is read out of the disc unit 115 when the approval terminal is turned on is stored in the memory unit 112. The control unit 111 (CPU) executes the process for the approval of transactions in accordance with the program stored in the memory unit 112.

A customer who requests a telephone transaction has to be registered. In the system, the registration of the customer is carried out over the telephone. The program of the process for the registration of the customer corresponds to a procedure shown in FIG. 4. To register a customer, the control unit 101 of the reception terminal performs the process for the registration of the customer in accordance with the procedure shown in FIG. 4.

Figure 4:
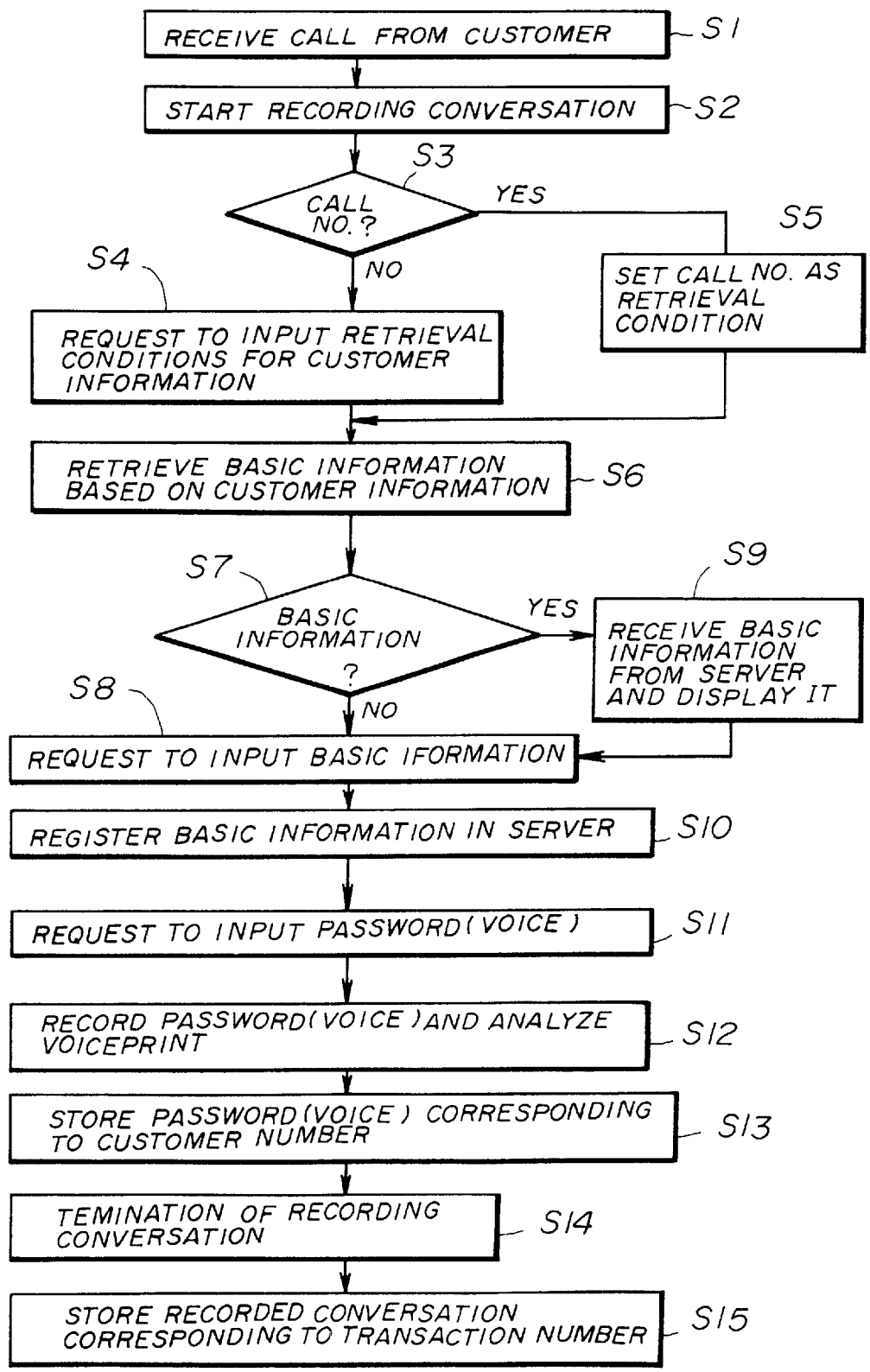
FIG. 4 is a flowchart illustrating a procedure of a process for registering a customer.

Referring to FIG. 4, after the control unit 101 detects that the internal telephone 107 receives a call from a customer (S1), the CPU 101 starts to record audio signals (corresponding to a conversation between an operator and the customer) in the memory unit 102 (S2). The CPU 101 then determines whether a call number (a telephone number of the customer) has been included in the call received by the internal telephone unit 107 (S3).

If the call number is not included in the call, the control unit 101 causes the display unit 103 to display guidance requesting the operator to input retrieval conditions of customer information (information related to customers) (S4). As a result, the display unit 103 displays a window, as shown in FIG. 5, to lead the operator to input the retrieval conditions. In this state, the operator hears the information related to the customer over the telephone from the customer and inputs the information using the input unit 104. Input information items corresponding to the respective retrieval conditions are indicated in the window shown by the display unit 103. A customer number which is one of the retrieval conditions is a number assigned to a customer who has had transactions with the bank.

On the other hand, if it is determined, in step S3, that the call number is included in the call from the customer, the control unit 101 sets the call number in a corresponding retrieval condition ("TEL" in FIG. 5) (S5). Thus, in this case, the window in which the telephone number of the customer is indicated in the item of the retrieval condition (TEL) (see FIG. 5) is initially shown by the display unit 103.

After the retrieval conditions are completely input, the control unit 101 communicates with the database server 14 via the LAN unit 106. Basic information corresponding to the input retrieval conditions is then retrieved in the database server 14 (S6). The basic information is information basically related to the customer and includes a telephone number, a name, an address, a birth day, the sex, a password number and the like. If the basic information corresponding to the retrieval conditions has not yet been stored in the database server 14 (in a case of a new customer) (NO in step S7), the control unit 101 causes the display unit 103 to display a screen (a customer information screen) to request the operator to input the basic information of the customer (S8). The customer information screen is, as shown in FIG. 6, divided into a customer basic information zone, an icon zone, a detailed transaction information zone and a script zone. The operator hears the basic information from the customer over the telephone and inputs the basic information using the input unit 104. The input basic information is displayed on the customer basic information zone of the customer information screen.

On the other hand, if the basic information corresponding to the retrieval conditions has been stored in the database server 14 ("YES" in step S7), the basic information is read out from the database server 14 and the control unit 101 receives the basic information from the database server 14 via the LAN unit 106. The control unit 101 causes the display unit 103 to display, as initial values, the received basic information on the customer basic information zone of the customer information screen (S9). In this case, if basic information items displayed by the display unit 103 differ from corresponding information items actually heard from the customer over the telephone, the operator corrects the basic information items.

After the customer basic information is set in the system (in the memory unit 102) as described above, the control unit 101 communicates with the database server 14 via the LAN unit 106 so as to register the customer basic information in the database server 14 (S10). The customer basic information corresponds to the customer number identifying the customer, and is managed as a customer basic information record as shown in FIG. 7 by the database server 14.

After the customer basic information is completely registered as has been described above, the control unit 101 causes the display unit 103 to display guidance requesting the operator to input password information (a voice) on a screen (S11). As the password information, meaningless words (such as ABC) and terms (a contract number, a name, a password number and the like) identifying the customer can be used. In accordance with the guidance, the operator instructs the customer over the telephone to speak a word which is to be the password information. When the customer speaks the word which is to be the password information over the telephone, the control unit 101 records voice data (corresponding to the password information) input via the internal telephone unit 107 in the memory unit 102 (S12).

After the voice data corresponding to the password information is recorded in the memory unit 102 as has been described above, the control unit 101 executes a process for analyzing a voiceprint of the customer from the voice data. The voiceprint of the customer can be analyzed in accordance with a known method (e.g., a method proposed in Japanese Patent Application No.7-102631). As a result of analyzing the voiceprint, voiceprint reference data formed of FFT (Fast Fourier Transform) spectrum and data representing pitch and modulation of the voice is obtained. The voiceprint reference data is used as the password information.

After the password information (the voiceprint reference data) is obtained as described above, the control unit 101 communicates with the database server 14 via the LAN unit 106. The password information is registered in the database server 14 so as to correspond to the customer number (S13). The password information is managed, as shown in FIG. 7, using a file name of "CUSTOMER NO.+FFT" in the database server 14.

The password information may be managed as an item of the basic information (may be included in the customer basic information record).

Figure 8:
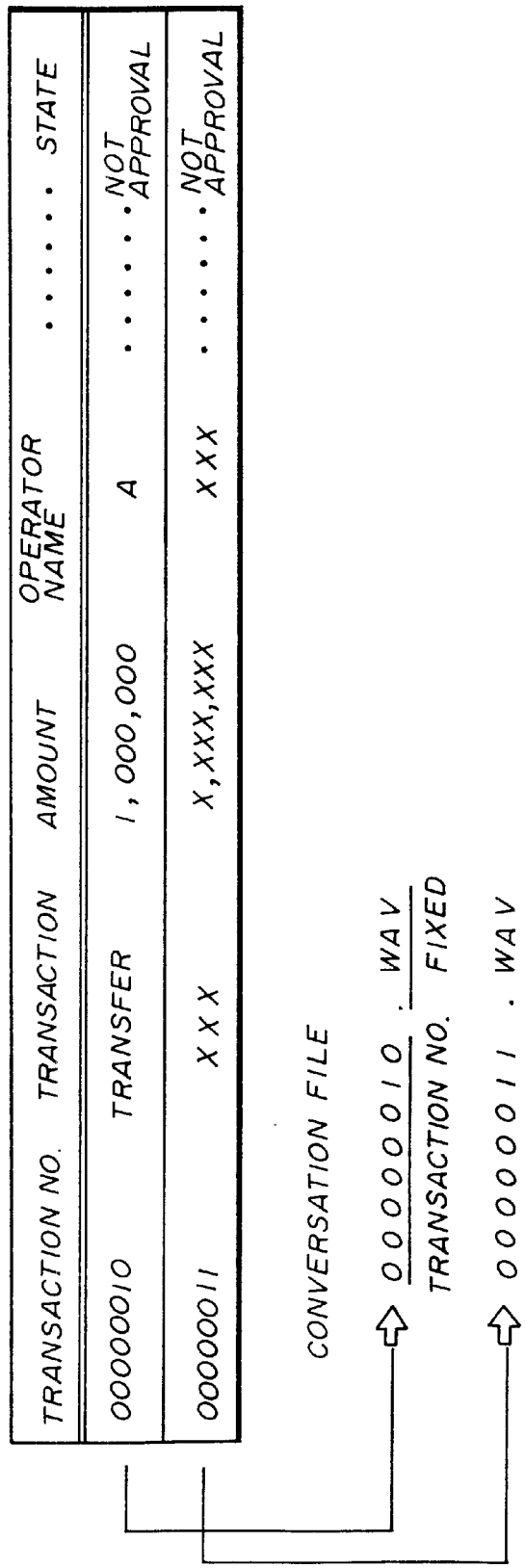
FIG. 8 is a diagram illustrating relationships between a transaction particulars record and conversation files made for transactions.

After the password information is completely registered, the control unit 101 terminates the recording of the conversation between the operator and the customer (S14). The control unit 101 then communicates with the database server 14 via the LAN unit 106, and the audio signals corresponding to the conversation which has been recorded in the memory unit 102 are recorded in the database server 14 so as to correspond to a present telephone transaction (a registration transaction) (S15). The audio signals corresponding to the conversation are managed using a file name of "TRANSACTION NO. .WAV" as shown in FIG. 8 in the database server 14. The contents of the registered transaction are managed using a transaction particulars record shown in FIG. 8 in the database server 14.

Even if the customer does not directly submit the registering specification to the bank, the customer can be registered in the database server 14 as a customer who is permitted to use the telephone transaction.

After transaction services for one day are completed, for example, in the database server 14, an issuance of a "TELEPHONE BANKING TRANSACTION ADMISSION SPECIFICATION" is performed in a batch processing manner. The process for the issuance of the transaction admission specification is performed in accordance with a procedure as shown in FIG. 9.

Figure 9:
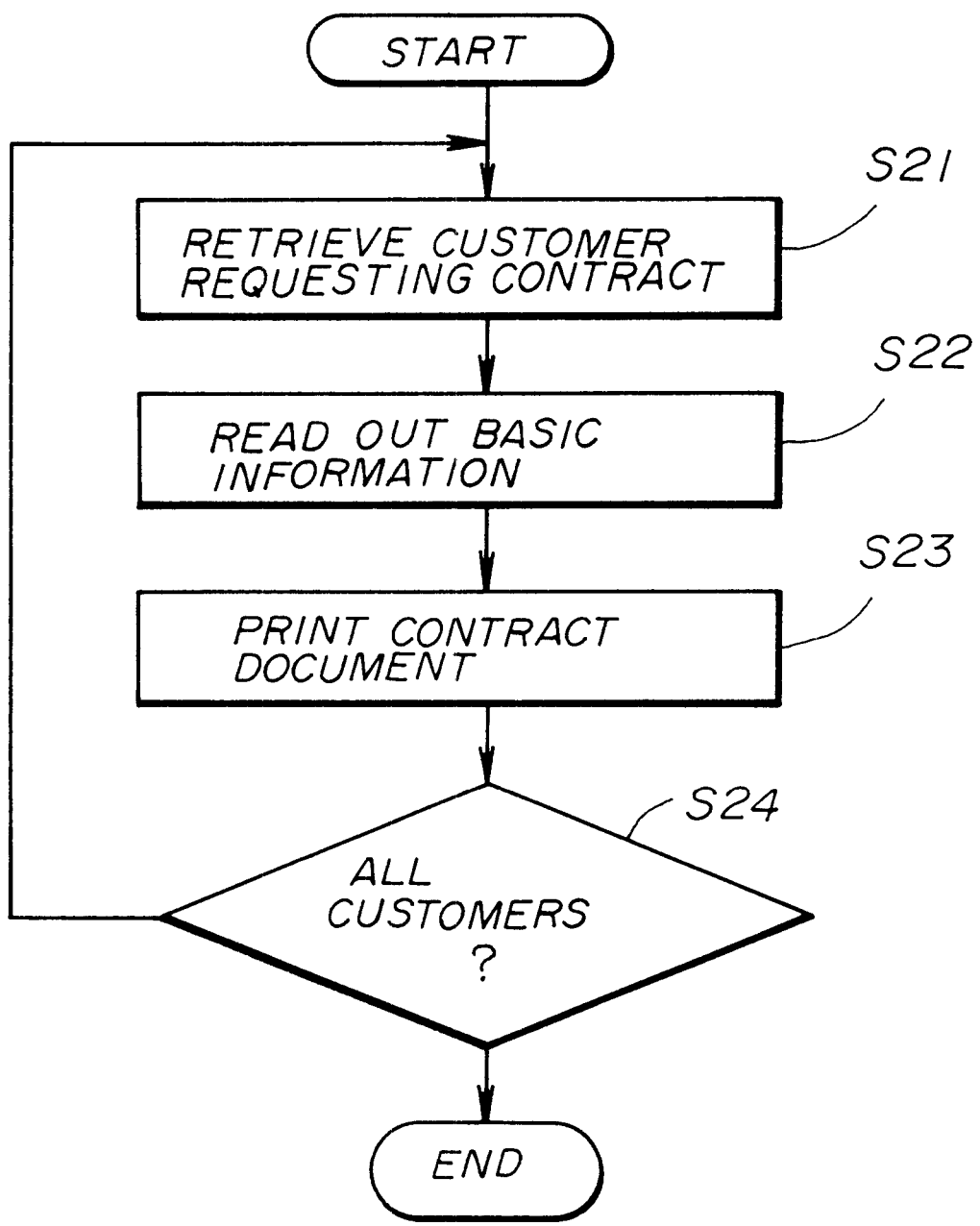
FIG. 9 is a flowchart illustrating a procedure of a printing process.

Referring to FIG. 9, when the operator performs an operation of starting the process for issuance of the transaction admission specification, new transactions registered during that day are retrieved from the transaction particulars record (see FIG. 8) (S21). As a result, customers (customer numbers) corresponding to the new registered transactions are specified. The customer basic information of the customers corresponding to the new registered transactions is then read out of the customer basic information record (S22). Print data corresponding to necessary items (an address, a name, an age, a birth day, a telephone number and the like) for the customer which should be printed on the transaction admission specification is generated. The database server 14 transmits the print data and a print instruction command to the printer unit 16 via the LAN (S23).

The printer unit 16 which has received the print data command prints necessary items for the customer on the transaction admission specification having a predetermined format based on the received print data. As a result, the transaction admission specification as shown in FIG. 10 is output by the printer unit 16. In FIG. 10, portions (xxxx) indicate the items printed based on the customer basic information.

The process for the issuance of the transaction admission specification is repeatedly performed for every customer corresponding to the new registered transactions retrieved in step S21 (S24).

The transaction admission specification printed out by the printer unit 16, as described above, is mailed to a corresponding customer. Since the necessary items have been already printed on the transaction admission specification, it is not necessary for the customer who receives the transaction admission specification to write the necessary items in the transaction admission specification. After only sealing (signing), the customer sends back the transaction admission specification to the bank by mail. Thus, the customer can be saved the trouble of making the transaction admission specification.

In the bank, the information regarding the customers and the passwords are electronically registered, and the transaction admission specifications as documents are in the custody of the bank.

In the system as described above, the process for the issuance of the transaction admission specification is performed in the database server 14 in accordance with the procedure shown in FIG. 9. However, the process may be performed in one of the reception terminals and one of the approval terminals. In addition, the customer number of the customer corresponding to the new registered transaction and the customer basic information may be transmitted to the host computer via the communication server 18 and the transaction admission specification may be printed by a high-speed printer of the host computer.

Necessary items for the customer may be printed on other documents required for the telephone transaction, such as the contract documents, based on the customer information.

A description will now be given of processes for the transaction over the telephone with the customer registered as described above.

Figure 11:
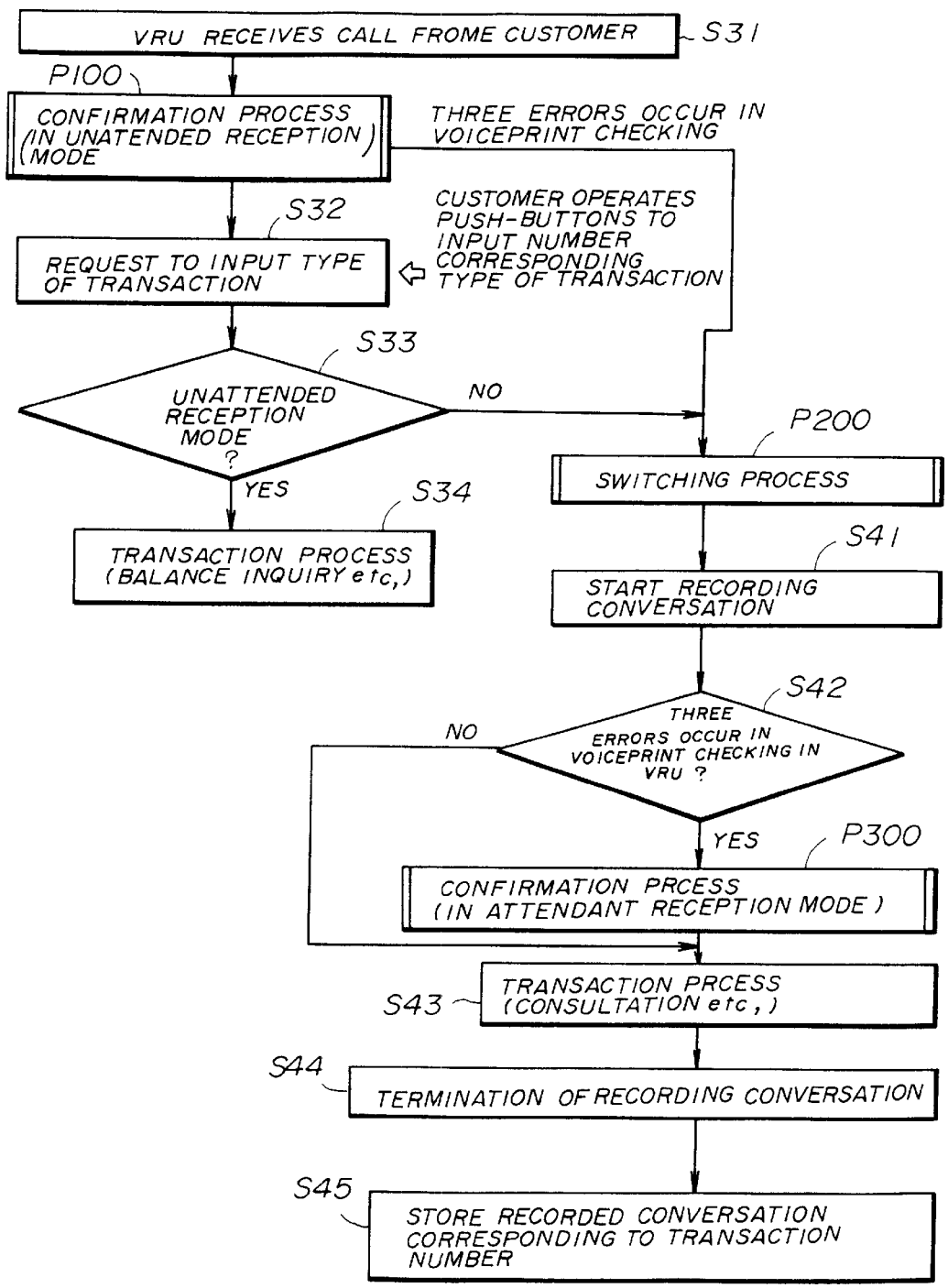
FIG. 11 is a flowchart illustrating a procedure of a reception process in a telephone transaction.

The processes for the telephone transaction are performed in the voice response unit 22 and the respective reception terminals 10(1), 10(2), . . . and 10(n), in accordance with a procedure shown in FIG. 11.

Referring to FIG. 11, a call from a customer requesting a telephone transaction is connected to the voice response unit 22 and the voice response unit 22 receives voice communication from the customer (S31). In this state, a control unit of the voice response unit 22 performs a confirmation process (P100). In the confirmation process, it is confirmed whether the customer requesting the telephone transaction is a customer who has been registered (who has permitted the telephone transaction). The detailed description of the confirmation process will be given later. If it is confirmed that the customer requesting the telephone transaction has been registered, in response to the call from the customer, the voice response unit 22 gives to the customer a voice message leading to input the type of transaction requested by the customer (S32). The customer who hears the voice message inputs via, a pushbutton, a number which has been assigned to the type of transaction (balance inquiry, deposit, consultation and the like) requested by the customer. The relationships between the pushbutton numbers and the kinds of transactions are stored in a memory of the voice response unit 22.

The control unit of the voice response unit 22 determines whether the transaction identified by the pushbutton number operated by the customer can be performed in an unattended reception mode (S33). The unattended reception mode is a mode in which the transaction can be received without any operators. If the transaction (e.g., balance inquiry) requested by the customer can be performed in the unattended reception mode, the control unit of the voice response unit 22 executes a process for the transaction (S34). That is, data regarding the contents of the transaction requested by the customer is transmitted from the voice response unit 22 to the database server 14 via the LAN. The data (the kind of the transaction, an account number for the customer and the like) is stored in the transaction particulars record, as shown in FIG. 8, of the database server 14. After the transaction requested by the customer is approved, the transaction is executed. For example, in a case of a balance inquiry about the account, an inquiry is made to the host computer via the communication server 18 as to the balance of the account. When the voice response unit 22 receives balance data from the host computer via the communication server 18, the voice response unit 22 informs the customer of the balance by voice. Then, the transaction (the balance inquiry) requested by the customer is completed.

Figure 12:
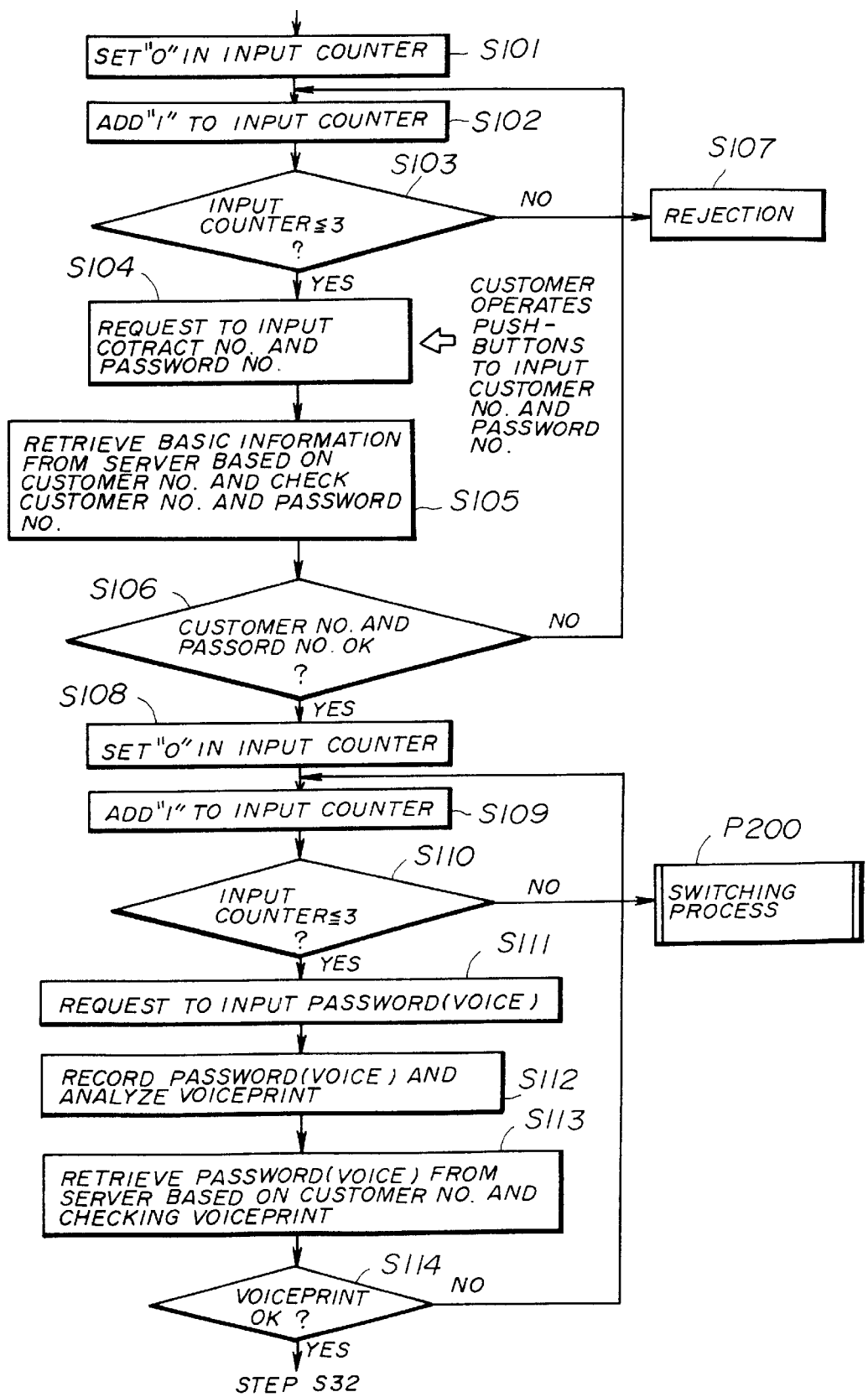
FIG. 12 is a flowchart illustrating a procedure of a process for confirming a customer in an unattended reception mode.

The confirmation process P100 is performed in accordance with a procedure as shown in FIG. 12.

Referring to FIG. 12, after the control unit of the voice response unit 22 resets an input counter provided therein to "0" (S101), the control unit increments the input counter by one (S102). A count value of the input counter is confirmed (S103), and the voice response unit 22 verbally requests the customer to input a customer number and a password in a voice (S104).

In response to the voice request, the customer operates pushbuttons to input the customer number and the password. The control unit then communicates with the database server 14 so as to instruct retrieval of the customer basic information (see FIG. 7) stored in the database server 14 using the customer number as a retrieval key (S105). Based on the retrieved results obtained in the database server 14, the control unit of the voice response unit 22 determines whether the customer number and the password which have been input by the customer are correct (S106).

If at least one of the customer number and the password is incorrect, the input counter is incremented by one (S102) and the voice response unit 22 requests the customer to input the customer number and the password again (S104). The process proceeds in accordance with the same steps (S105 and S106) as in the above case. If three input operations of incorrect customer numbers or passwords are continuously carried out by the customer (No, in S106), the control unit performs a process for rejecting the transaction requested by the customer (S107). For example, a message informing the customer that the transaction is not allowable due to the incorrect input password is supplied to the customer and the call is disconnected.

In the processes describe above, if the customer number and the password are correct (YES in S106), the control unit resets the input counter to "0" (108) and then increments the input counter by one (S109). After confirming the count value of the input counter (S110), the voice response unit 22 requests the customer, in a voice, to speak a predetermined word corresponding to the password information registered in the system (S111).

In response to the request from the voice response unit 22, the customer speaks the predetermined word corresponding to the password information registered in the system. At this time, the control unit of the voice response unit 22 records audio data corresponding to the predetermined word obtained over the telephone in the memory (S112). The audio data recorded in the memory, as has been described above, is applied with the voiceprint analysis in the same manner as in the case of registration of the customer (see step S12 in FIG. 4). As a result, voiceprint data (the FFT spectrum of the voice and data representing the pitch and modulation) is obtained (S112).

After this, the control unit communicates with the database server 14 instructing retrieval of the password information (see FIG. 7) stored in the database server 14 using the input customer number as a retrieval key (S113). The database server 14 transmits password information corresponding to the customer number obtained as retrieval results to the voice response unit 22 via the LAN. After receiving the password information, the control unit of the voice response unit 22 compares the voiceprint data obtained as the analyzing result of the voiceprint analysis and the received password information (voiceprint data) (S113). The control unit then determines, based on the comparing result, whether the voiceprint data obtained as the analyzing result of the voiceprint analysis corresponds to the password information (S114). If it is determined that the voiceprint data corresponds to the password information (Yes in S114), it is confirmed that the customer has been registered in the system, and the process proceeds to step S32 (the request for the kind of transaction) shown in FIG. 11.

On the other hand, if it is determined that the voiceprint data does not correspond to the password information (No in S114), Registration of the customer is not confirmed, and the voiceprint comparing process is performed again. That is, the input counter is incremented by one (S109) and the customer is requested to speak the predetermined word corresponding to registered password information (S111). Voiceprint data is obtained and compared with the password information (S112 and S113). In a case where it is continuously determined three times that the voiceprint data does not correspond to the password information (No in S110), the control unit performs a switching process (P200) so that the operator directly deals with the customer over the telephone (an attendant reception mode). The switching process P200 for switching the unattended reception mode to the attendant reception mode is performed in accordance with a procedure as shown in FIG. 13.

Figure 13:
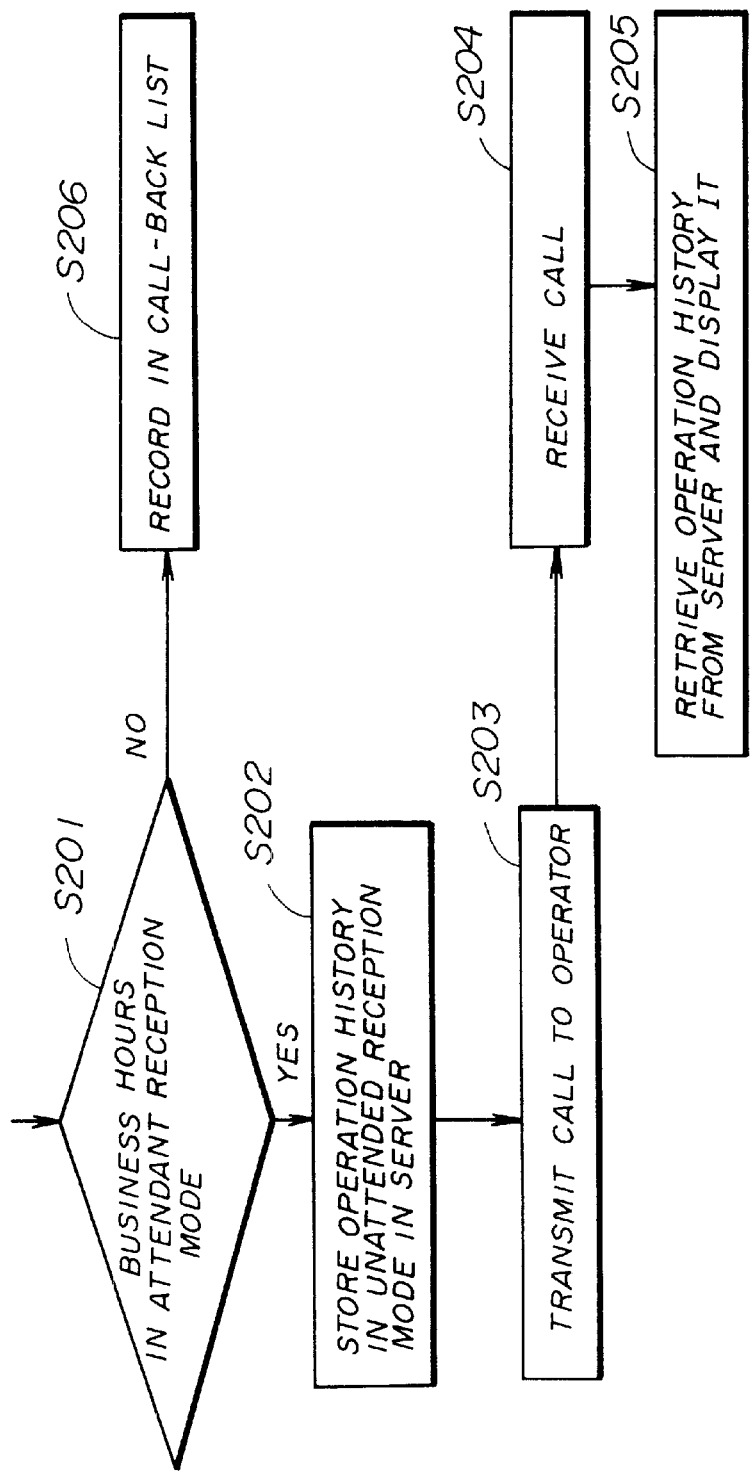
FIG. 13 is a flowchart illustrating a procedure of a process for switching to an attendant reception mode.

Referring to FIG. 13, the control unit of the voice response unit 22 determines whether it is during business hours in which services are allowable in the attendant reception mode (S201). If it is determined that it is not during the business hours (No in S201), the control unit of the voice response unit 22 communicates with the database server 14 so as to register a customer number of the customer and a request time in a call-back list in the database server 14 (S206).

In this case, during business hours the next day, a predetermined reception terminal reads out of the database server 14 the customer basic information corresponding to the customer number registered in the call-back list. The customer basic information read out of the database server 14 is displayed on the display unit 103 of the reception terminal. The operator of the reception terminal looks at the customer basic information displayed on the display unit 103 and calls the customer. The operator then asks the customer about various items of information over the telephone to confirm the customer.

On the other hand, if it is determined, in step S201, that the call is during business hours (Yes in S201), the control unit of the voice response unit 22 communicates with the database server 14 so as to store operations which have been performed by the customer in accordance with the guidance from the voice response unit 22 in the database server 14 (S202). The operations (an operation history) are recorded so that the operation history corresponds to the customer number. The call from the customer is transmitted to one of the reception terminals (S203).

When a reception terminal receives the call from the voice response unit 22 (S204), the operator asks the customer about the customer number and inputs, to the reception terminal, the customer number as a retrieval key used to retrieve the operation history. The control unit 101 of the reception terminal then communicates with the database server 14 so as to request retrieval of the operation history using the customer number as the retrieval key (S205). When the control unit 101 of the reception terminal receives the operation history retrieved by the database server 14, the control unit 101 causes the display unit 103 to display the operation history (S205). The operator looks at the operation history and deals with the customer over the telephone. As a result, the reception process, as will be described later, is performed in the attendant reception mode.

Returning to FIG. 11, in a case where the customer can not be confirmed based on the comparison result between the voiceprint data and the password information in the confirmation process P100 in the unattended reception mode, the switching process P200 for switching from the unattended reception mode to the attendant reception mode is performed. On the other hand, in a case where the customer is confirmed, if a transaction requested by the customer is not allowable in the unattended reception mode, the switching process P200 for switching to the attendant reception mode is performed.

After the switching process 200 (see FIG. 13) is completed, in the reception terminal to which the call from the customer is transmitted, the process proceeds from step S41 shown in FIG. 11.

When the operator starts the telephone conversation with the customer, the control unit 101 starts to record the contents of the conversation (conversation recording) (S41). The control unit 101 then determines, with reference to the operation history of the customer described above, whether or not three times of voiceprint comparison are incomplete in the voice response unit 22 (VRU), namely whether or not the customer has been confirmed in the unattended reception mode (S42).

In a case where the customer has been already confirmed (No in S42), the control unit 101 causes the display unit 103 to display a message to the effect that the customer has already been confirmed. The operator looks at the message and confirms the contents of the telephone transaction requested by the customer. The operator then inputs the contents of the transaction to the reception terminal using the input unit 104.

Then, the control unit 101 performs a corresponding transaction process (S43). In the transaction process, the control unit 101 communicates with the database server 14 so as to record the contents of the transaction input by the operator in the transaction particulars record (see FIG. 8) of the database server 14. After this, the control unit 101 terminates recording the conversation with the customer (S44). Further, the control unit 101 communicates with the database server 14 so as to store the contents of the conversation recorded in the memory unit 102 in a conversation file (see FIG. 8), of the database server 14, related with a transaction number (S45).

If it is determined, in step S42, that the customer has not been confirmed in the confirmation process P100 in the unattended reception mode in the voice response unit 22, a confirmation process P300 in the attendant reception mode starts.

Figure 14:
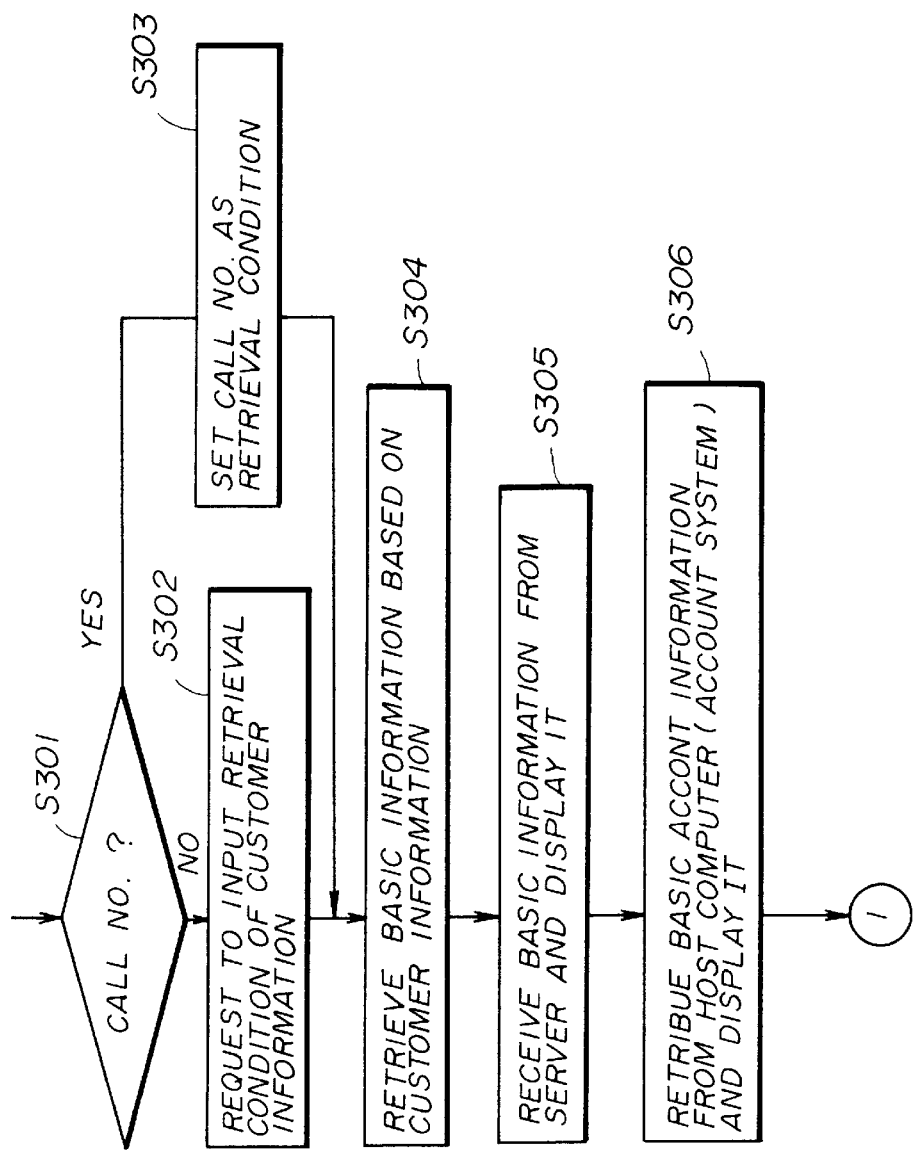
FIG. 14 is a flowchart illustrating a procedure of a process for confirming a customer in the attendant reception mode.
Figure 15:
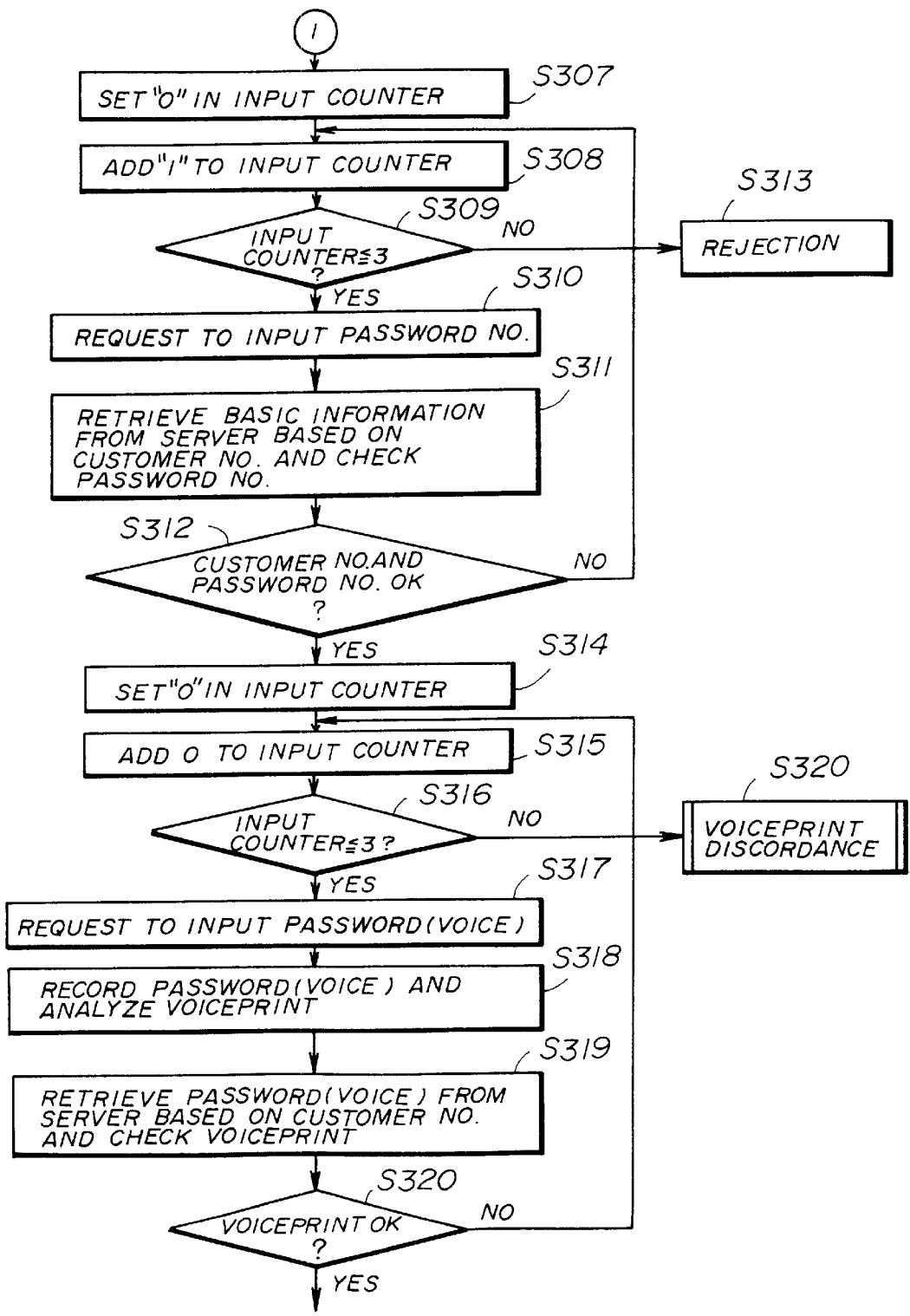
FIG. 15 is a flowchart illustrating a procedure of the process for confirming a customer in the attendant reception mode.

The confirmation process P300 in the attendant reception mode is performed in accordance with a procedure as shown in FIG. 14 and FIG. 15.

First, referring to FIG. 14, the control unit 101 determines whether a call number (a telephone number) has been included in a call from the customer (S301). If the call number is not included in the call (No in S301), the control unit 101 causes the display unit 103 to display a message requesting the operator to input retrieval conditions for the customer information (S302). The operator asks the customer about the retrieval conditions (a name, a customer number, a telephone number and the like) in accordance with the message and then inputs the retrieval conditions using the input unit 104. The input retrieval conditions are set, for example, in an internal register of the control unit 101. On the other hand, if the call number is included in the call from the customer (Yes in S301), the control unit 101 automatically sets the call number (the telephone number) in the internal register thereof (S303).

As has been described above, the retrieval conditions for the customer information are set in the internal register of the control unit 101, the control unit 101 communicates with the database server 14 so as to transmit a retrieval instruction for the customer basic information and the retrieval conditions set in the internal register to the database server 14, (S304). The database server 14 which receives the retrieval instructions, searches the customer basic information record for the customer basic information corresponding to the retrieval conditions. The customer basic information corresponding to the retrieval conditions is transmitted from the database server 14 to the reception terminal. In the reception terminal which receives the customer basic information, the control unit 101 stores the received customer basic information in the memory unit 102 and causes the display unit 103 to display the customer basic information (S305). The customer basic information is displayed, for example, in the customer basic information zone of the screen shown in FIG. 6.

After this, the control unit 101 requests the host computer via the communication server 18 to retrieve account information (an account inquiry, a history inquiry and the like) based on the customer basic information (S306). When the reception terminal receives the retrieval result (the account information), the control unit 101 causes the display unit 103 to display the account information. The account information is displayed along with information regarding actual conditions of transactions with the customer, for example, in the transaction detailed information zone of the screen shown in FIG. 6.

After this, the operator continues the conversation with the customer over the telephone while looking at the customer basic information (name, sex, birthday, password number, address and the like). Thus, the operator can know information regarding the customer before actually starting the transactions with the customer.

As has been described above, the confirmation process for the customer is performed with the information regarding the customer displayed by the display unit 103.

The confirmation process is performed in accordance with a procedure as shown in FIG. 15.

The confirmation process is the same as the confirmation process P100 (see FIG. 12) in the unattended reception mode. That is, it is determined whether the password number and the customer number specified by the customer correspond to those included in the customer basic information (S307 through S312). If those correspond to each other, a checking process is performed for checking whether voiceprint data representing a voice of the predetermined word corresponding to the password information correspond to the registered password information (S314 through S320).

In the confirmation process, when a request for inputting the password number is displayed on the screen (S310), the operator directly asks the customer about the password number over the telephone. The operator who hears the password number from the customer inputs the password number using the input unit 104. In addition, the operator directly requests the customer to speak the predetermined word corresponding to the password information (S317).

If three incorrect password numbers are continuously input by the customer, the control unit 101 causes the display unit 103 to display a message to the effect that the transaction is rejected (S313). The operator looks at the message, and informs the customer that the transaction can not be received.

In addition, if it is determined for three times that the voiceprint data does not correspond to the registered password information (S316), the control unit 101 causes the display unit 103 to display a message to the effect that the voiceprint data does not correspond to the registered password information (S321). The operator looks at the message and informs the customer of this matter. The operator further confirms, with the customer, whether the information (birthday, address, family of the customer) regarding the customer displayed on the screen is correct so as to confirm whether the person talking with the operator is the customer identified by the customer number. If the operator confirms that the person talking with the operator over the telephone is the customer identified by the customer number, the transaction requested is received.

As has been described above, the contents of the transaction received by the voice response unit 22 and the reception terminal are stored as the transaction particulars record in the database server 14. Then, in each of the approval terminals 13(1) and 13(2), the approving process for each of the transactions is performed.

Figure 16:
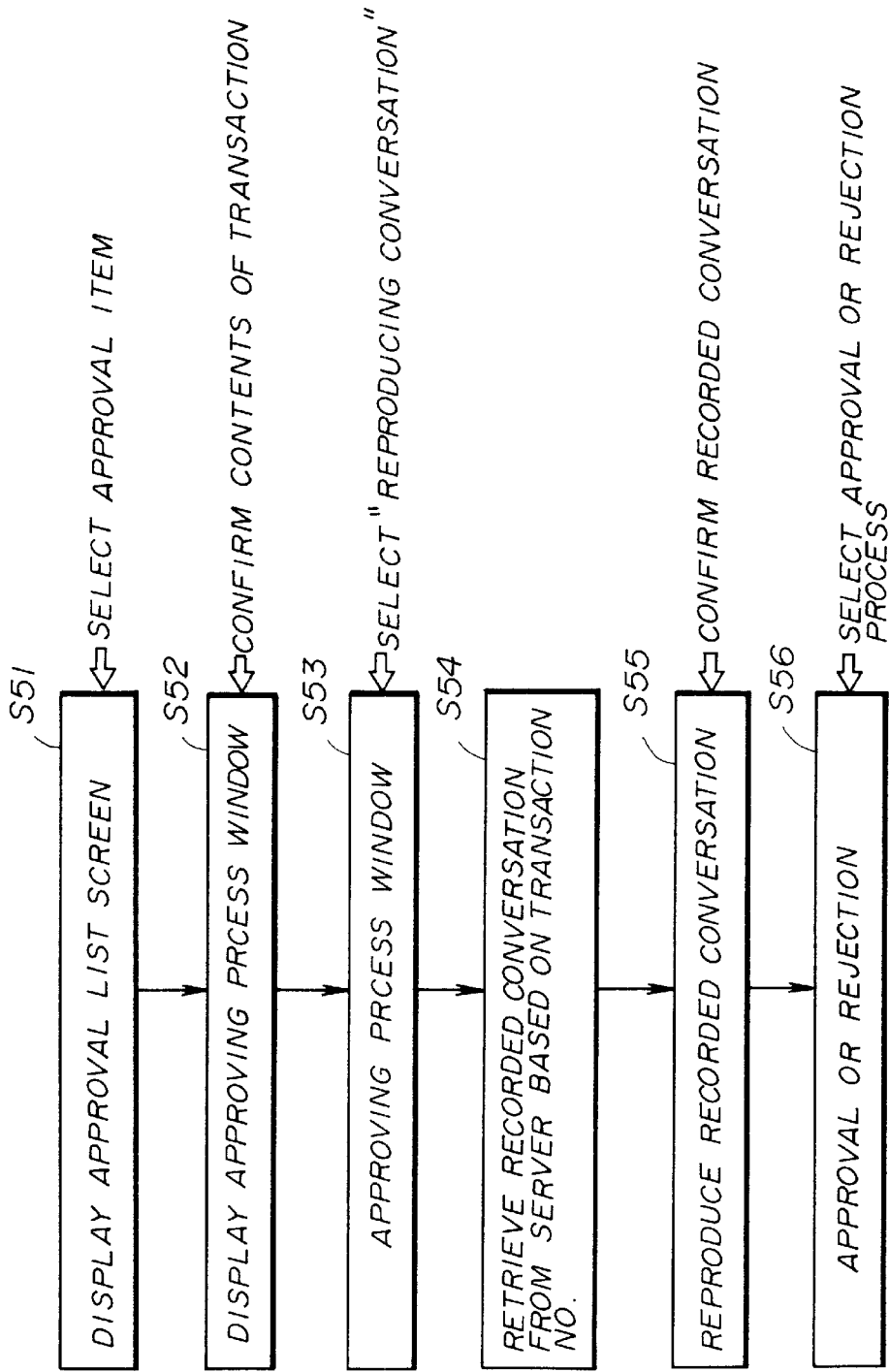
FIG. 16 is a flowchart illustrating a procedure of an approving process.

The approving process is performed in accordance with a procedure as shown in FIG. 16.

Referring to FIG. 16, when an operator of an approval terminal carries out a starting operation for the approving process, the control unit 111 communicates with the database server 14 via the LAN unit 116 so as to read out the contents of each of the transactions recorded in the transaction particulars record. The contents of each of the transactions read out from the database server 14 is stored in the memory unit 112. The control unit 111 then causes the display unit 113 to display a list of the contents of the respective transactions (S51). A screen on which the list of the contents of the respective transactions is referred to as an approval list screen. The approval list screen is formed as shown in FIG. 17. That is, for each of the received transactions, items of "TRANSACTION NO.", "KIND OF TRANSACTION", "TRANSACTION AMOUNT", "RECEPTION OPERATOR", "APPROVAL STATE" and the like are displayed.

When the operator points out a transaction number using the input unit 114 (the mouse), the control unit 111 read out of the memory unit 112 the contents of a transaction identified by the transaction number. The control unit 111 then causes the display unit 112 to display the contents of the transaction in an approving process window as shown in FIG. 18 (S52). In the approving process window, the transaction number, the content of the transaction and an item of "REPRODUCING CONVERSATION" are displayed.

When the operator selects the item "REPRODUCING CONVERSATION" using the input unit 114 (the mouse) (S53), the control unit 111 communicates with the database server 14 so as to request the database server 14 to retrieve a conversation file (see FIG. 8) corresponding to the transaction number (S54). Audio data of the conversation file (TRANSACTION NO. . WAV) is transmitted to the approval terminal. The approval terminal which receives the audio data stores the audio data in the memory unit 112. The control unit 111 then transmits the audio data from the memory unit 112 to the voice output unit 117. As a result, the conversation with the customer which was recorded in the reception of the transaction is reproduced from the voice output unit 117 (S55).

The operator of the approval terminal looks at the contents of the transaction displayed by the display unit 113 (see FIG. 18) and hears the conversation reproduced from the voice output unit 117. Based on the contents of the transaction and the conversation, the operator determines whether the contents of the transaction were positively requested by the customer. The operator then inputs an approval result (whether the transaction should be approved or rejected) using the input unit 114 (S56). The control unit 111 records information of the approval result in the item of the state in the transaction particulars record (see FIG. 8 and FIG. 17).

The contents of the transaction approved by the operator of the approval terminal, as has been described above, are transmitted from the database server 14 to the host computer (an account system) via the communication server. In the host computer, a process corresponding to the contents of the transaction (transferring money from an account A of the bank to an account B of an identified bank) is executed.

According to the system described above, the customer can carry out the admission of the telephone transaction and the reception of the banking transaction over the telephone without directly going to the bank. Since the customer is confirmed using the voiceprint, a third person can be prevented from malicious telephone transactions.

In addition, since it is determined, based on the conversation at the time of the reception of the telephone transaction, whether the transaction is approved, it can be easily confirmed that the contents of the transaction are positively requested by the customer.

In the above embodiment, the voiceprint data corresponding to the predetermined word is used as the password information. The present invention is not limited to this, Other types of features obtained from analyzing voices, corresponding to a predetermined word spoken by the customer, in accordance with a predetermined algorithm may be used as the password information.

A description will now be given of a second embodiment of the present invention.

Figure 19:
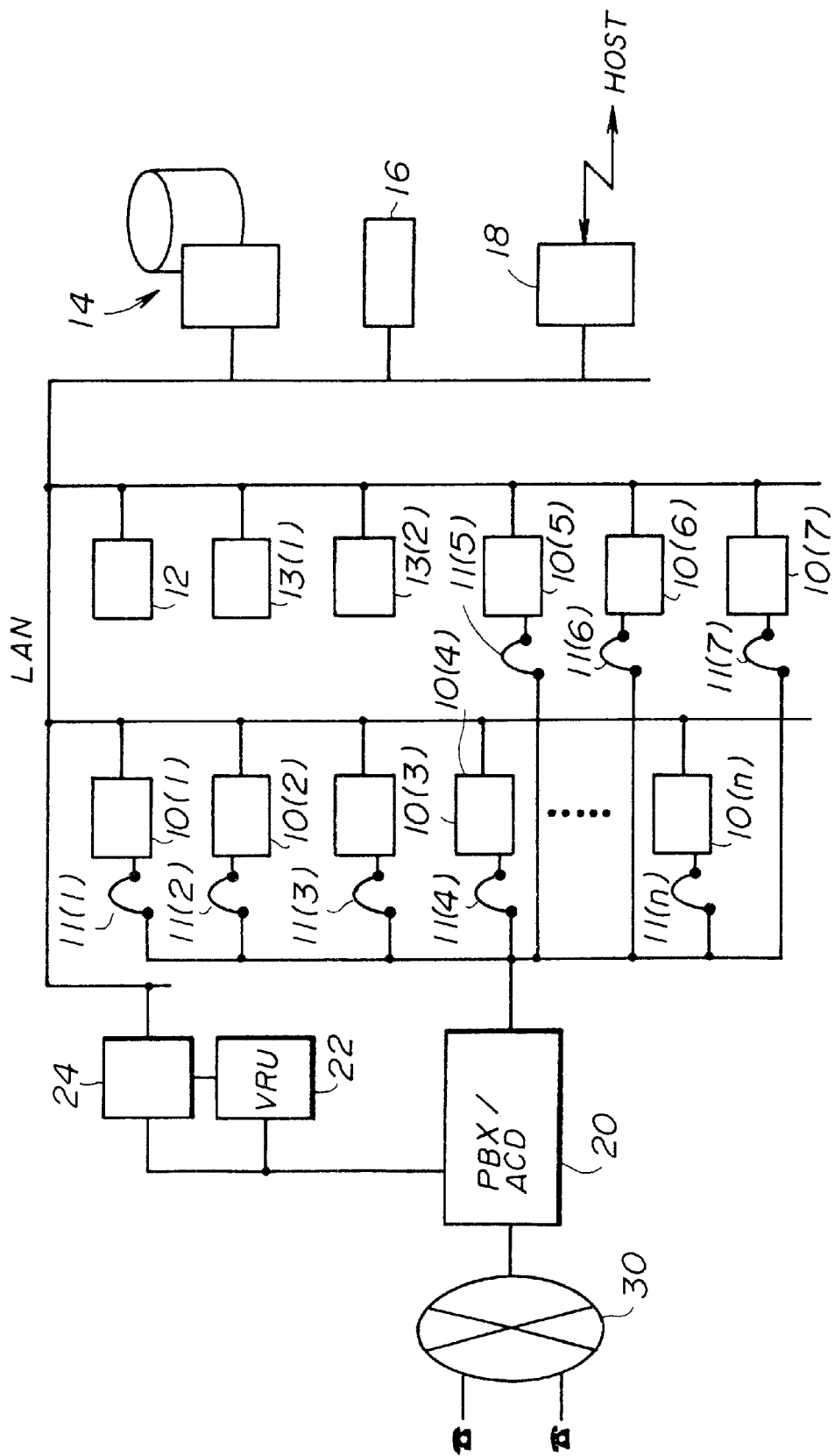
FIG. 19 is a block diagram illustrating a hardware structure of a telephone transaction support system to which a telephone call connection control system is applied.

The telephone transaction support system according to the second embodiment of the present invention is formed as shown in FIG. 19. The telephone transaction support system according to the second embodiment includes a telephone call connection control system by which a call from a customer is connected to a reception terminal of an operator congenial to the customer. In FIG. 19, those parts which are the same as those shown in FIG. 1 are given the same reference numbers.

Referring to FIG. 19, the system has the reception terminals 10(1), 10(2), . . . and 10(n), the monitoring terminal 12, the approval terminals 13(1) and 13(2), the database server 14, the printer unit 16, the communication terminal 18 and the voice response unit 22 in the same manner as the system shown in FIG. 1. The system further has a responding terminal 24. The respective reception terminals 10(1), 10(2), . . . and 10(n), the voice response unit 22 and the responding terminal 24 are connected to the exchange (PBX) 20. The voice response unit 22 is controlled by the responding terminal 24. The exchange 20 connects a call from an external telephone to the voice response unit 22 and the responding terminal 24 in principle.

Figure 20:
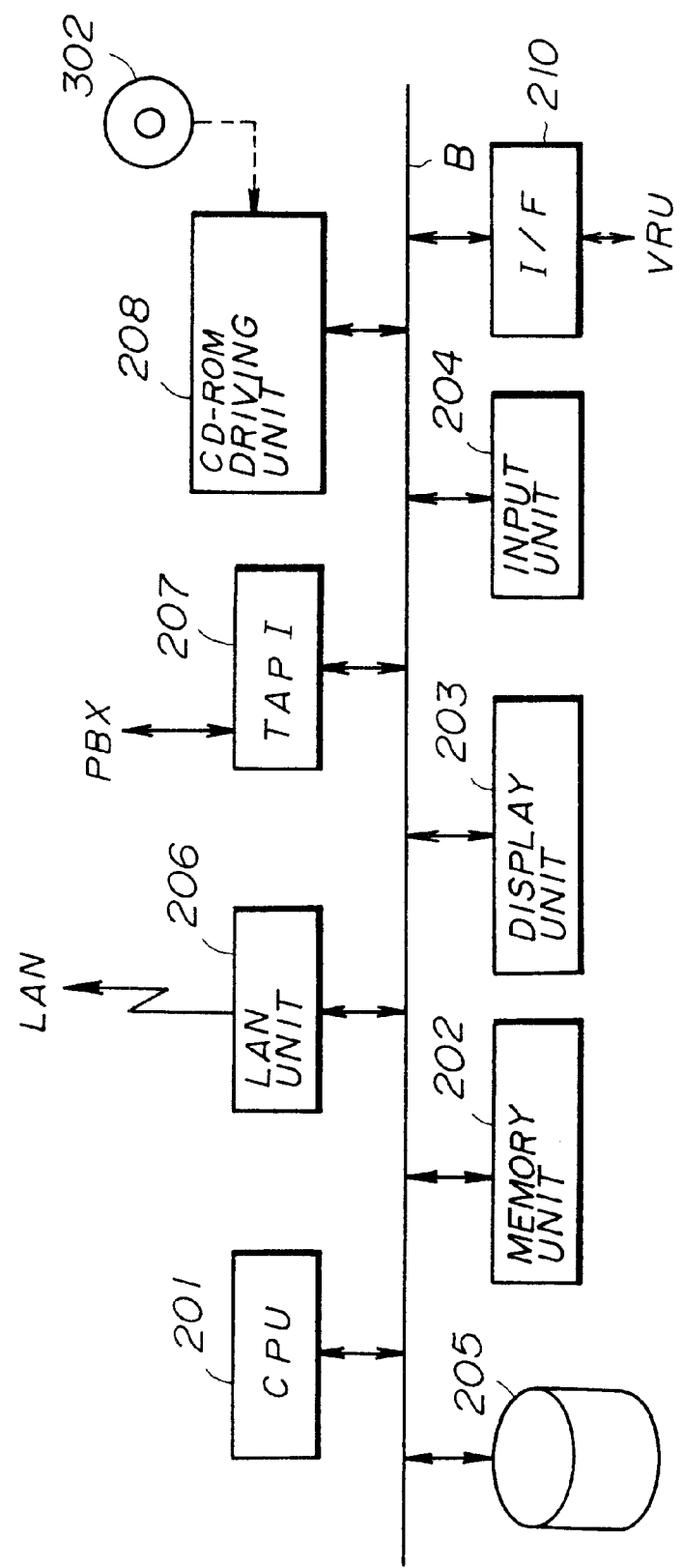
FIG. 20 is a block diagram illustrating a hardware structure of a responding terminal included in the system shown in FIG. 19.

The responding terminal 24 is formed as show in FIG. 20.

Referring to FIG. 20, the responding terminal 24 has a control unit 201 including a CPU, a memory unit 202, a display unit 203, an input unit 204, a disc unit 205, a LAN unit 206, an internal telephone unit 207, a CD-ROM driving unit 208 and an interface unit 110 which interfaces the voice response unit (VRU) 22 with the responding terminal 24. These units are connected to each other by the system bus B.

The control unit 201 controls the responding terminal 24 and executes a process for telephone call connection control which will be described later. The memory unit 202 includes a RAM and a ROM and stores programs which should be executed by the control unit 201 and necessary data obtained in the processes. The display unit 203 has a CRT or a LCD (Liquid Crystal Display) panel and displays a state of the responding terminal 24 and other necessary information items. The input unit 204 is formed of a keyboard and a mouse used to input information to the responding terminal 24. The LAN unit 206 is connected to the LAN so that data communication between the LAN unit 206 and the LAN is performed. The internal telephone unit (TAPI) 207 is connected to the exchange (PBX) 20 so that the telephone communication (calling control, extension connecting control and the like) is performed between the exchange 20 and the internal telephone unit 207. Voice response control information is supplied from the control unit 201 to the voice response control unit 22 via the interface unit 110.

The CD-ROM 302 is stored with a program formed of program codes representing a process for a telephone call connection control. The program is read out of the CD-ROM 302 set in the CD-ROM driving unit 208 and installed into the disc unit 205. When the responding terminal is turned on, the program is read out of the disc unit 205 and stored in the memory unit 202. In this state, the control unit 201 (CPU) executes the process for the telephone connection control in accordance with the program stored in the memory unit 202.

Figure 21:
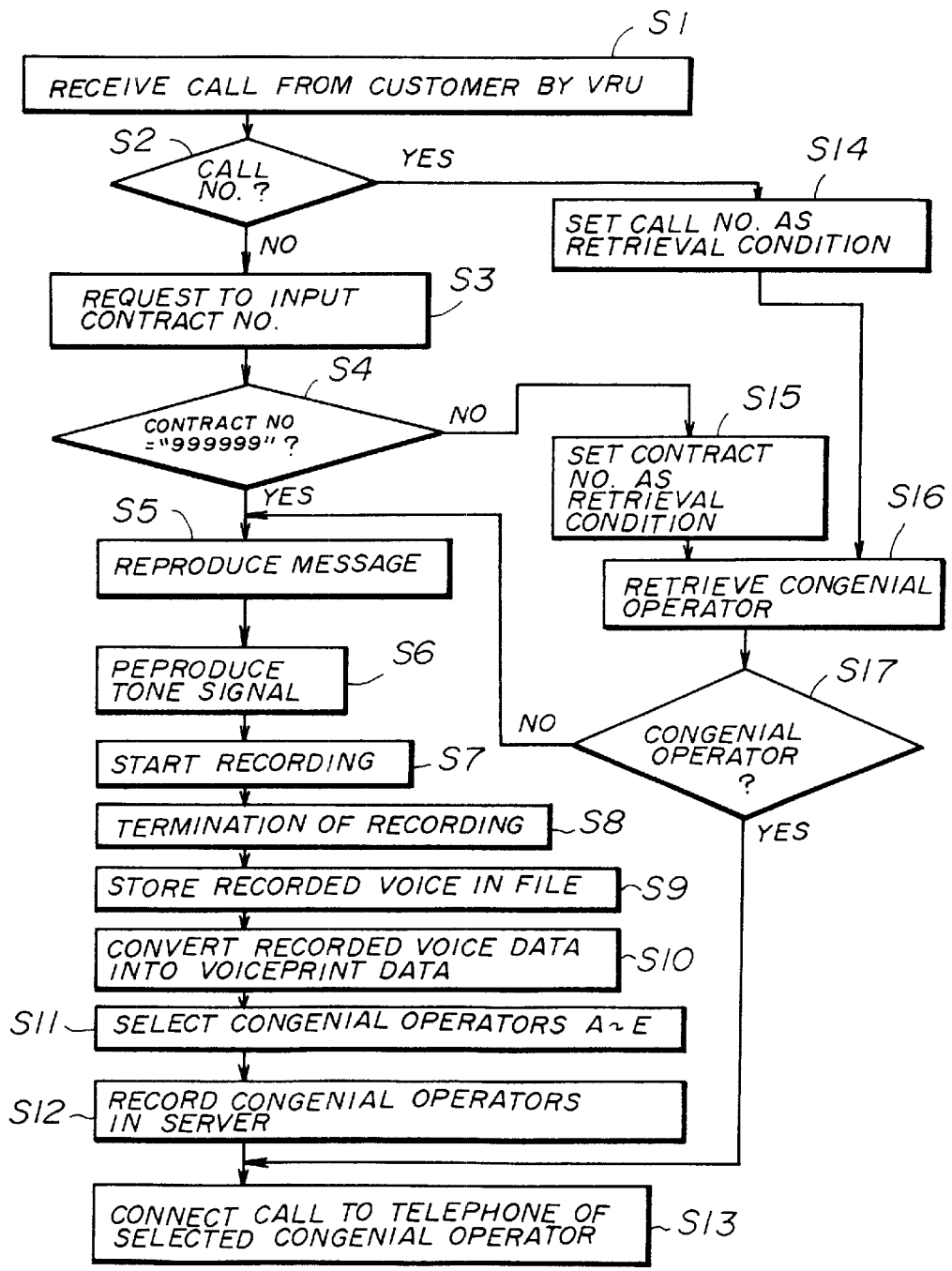
FIG. 21 is a flowchart illustrating a procedure of a process of telephone call connection control.

The program for the telephone connection control corresponds, for example, to a procedure shown in FIG. 21, so that the control unit 201 performs the process in accordance with the procedure shown in FIG. 21.

Referring to FIG. 21, a call from a customer is connected to the voice response unit 22 (S1). At this time, the control unit 201 of the responding terminal 24 detects that the call from the customer is received by the internal telephone 207. The control unit 201 then determines whether a call number (a telephone number) is included in the call (S2). If a call number is not included in the call (No. in S2), the control unit 201 transmits to the voice response unit 22 via the interface unit 110 a control signal for instructing a request to the customer to input a contract number (S3). The contract number is one of information items identifying the customer and a number indicated in the contract document for the banking transaction over the telephone.

The voice response unit 22 which receives the control signal sends back a message instructing the customer to input the contract number. For example, a message "PLEASE INPUT A CONTRACT NUMBER. IF YOU HAVE NO CONTRACT NUMBER, PLEASE INPUT A NUMBER OF 999999" is sent back to the customer. The number input by the customer is supplied to the control unit 201 via the internal telephone unit 107.

The control unit 201 determines whether the number input by the customer is equal to "999999" (S4). If the number input by the customer is equal to "999999"(in a case of a new customer) (Yes in S4), the control unit 201 transmits an instruction control signal for requesting the customer to speak a predetermined word to the voice response unit 22 (S5). The voice response unit 22 which receives the instruction control signal sends back a message instructing the customer to speak a predetermined word "xxxxx". For example, a message "A CALL IS TRANSFERRED TO AN OPERATOR. PLEASE SPEAK "xxxxx" AFTER A TONE SIGNAL" is sent back to the customer.

After this, the voice response unit 22 reproduces the tone signal based on an instruction from the responding terminal 24 (S6). The control unit 201 of the responding terminal 24 then starts a recording process for recording speech of the customer (S7). The recording process is terminated after a predetermined time (S8).

The customer who heard the tone signal speaks "xxxxx" in accordance with the message from the voice response unit 22. In the recording process in the control unit 201, a voice corresponding to the predetermined word "xxxxx" spoken by the customer is received by the responding terminal 24. Voice data is then stored as the voice file in the memory unit 202 (S9).

After this, the control unit 201 executes a process for the voiceprint analysis with respect to the voice data stored in the voice file in the memory unit 202 (S10). The voiceprint analysis is performed in the same manner as in the first embodiment so that the voiceprint data is obtained.

Voiceprint data obtained from the voiceprint analysis with respect to a voice of each of the operators of the respective reception terminals 10(1), 10(2), . . . and 10(n) has been previously registered in the system. The voiceprint data of each of the operators is stored as an operator information record in the database server 14. The operator information record has an operator code identifying the operator in charge of the reception, an extension number of the reception terminal of the operator and the voiceprint data of the operator. When services for a day start, respective operators of the reception terminals carry out log-in operations, so that extension numbers in the operator information records are rewritten to the extension numbers of the reception terminals in which the operators actually perform the log-in operations.

As has been described above, after receiving the voiceprint data of the customer, the control unit 201 communicates with the database server 14 via the LAN unit 206 so as to perform the voiceprint comparison process for comparing the voiceprint data of the customer and the voice data of each of the operators with each other (S11). In the voiceprint comparison process, operators corresponding to voiceprint data related to the voiceprint data of the customer under a predetermined condition are selected. As has been proposed in Japanese Laid Open Patent Application No.7-102631, according to the voiceprint comparison process, operators who may be congenial to the customer can be selected. For example, five operators A, B, C, D and E who may be congenial to the customer are selected in this embodiment.

After this, the control unit 201 further communicates with the database server 14 so as to register the five operators who may be congenial to the customer (S12). Congenial operator information records represents operators who may be congenial to the customer are formed as shown in FIG. 23. That is, each of the congenial operator information records includes information (e.g., a contract number, a calling number) identifying the customer, operator codes of the operators selected as the congenial operators and extension numbers of reception terminals used by the selected operators. Every time an operator carries out the log-in operation, the extension number in the congenial operator information record is rewritten to an extension number of a reception terminal in which the operator carried out the log-in operation.

After this, the control unit 201 further selects a single operator from among the operators selected as the congenial operators (S13). In this selection process, a single operator is selected by use of an algorithm which uniformly distributes work load among the operators. The control unit 201 then communicates with the database server 14 so as to look up the congenial operator information record corresponding to the customer. The control unit 201 instructs the exchange 20 to transmit the call from the customer to a reception terminal identified by an extension number for the selected operator, with reference to the congenial operator information record. As a result, the call from the customer is connected to the reception terminal of the operator who may be congenial to the customer.

In this state, the conversation for the guidance and reception of the banking transaction is performed between the customer and the operator who may be congenial to the customer. Thus, the customer can comfortably receive the services of the bank.

On the other hand, if it is determined that a call number is included in the call from the customer (Yes in S2), or if a contract number other than "99999" is input by the customer (No in S4), the control unit 201 sets the call number or the contract number as a retrieval key in an internal register (S14 or S15). The control unit 201 then communicates with the database server 14 so as to retrieve the congenial operator information (see FIG. 23) for the customer identified by the call number of the contract number (S16). If operators who may be congenial to the customer have been registered in the system (Yes in S17), a single operator is selected from among the operators who may be congenial to the customer in the same manner as in the above case. As a result, the call from the customer is connected to the reception terminal of the selected operator (S13).

If the congenial operator information record for a customer whose call number is included in the call and/or whose contract number is received has not yet formed in the database server 14, the process for registering operators who may be congenial to the customer is performed in the same manner (S5-S12) as in the above case.

Operators who may be congenial to the customer can be selected in accordance with various algorithms using the comparison of the voiceprint data of the customer and the voiceprint data of operators. In the above embodiment, since operators who may be congenial to the customer are selected based on the comparison of the voiceprint data of the customer and the registered voiceprint data of the operators, even if a call is received from a new customer, the operator who may be congenial to the new customer can be selected. However, operators who may be congenial to each customer can be registered in accordance with other rules. Operators who gain the confidence of customers in transactions may be registered as operators who may be congenial to each such customer.

In the second embodiment, the response terminal 24 connected with the voice response unit 22 performs the process for the telephone call connection control. The present invention is not limited to this. One of the reception terminals may be set as a primary reception terminal for performing the process for the telephone call connection control. The primary reception terminal is formed in the substantially the same way as that shown in FIG. 20. In a case where the primary reception terminal is used, voice responses of an operator of the primary reception terminal are substituted from the voice responses of the voice response unit 22.

In the above embodiments, the program for the reception of the telephone transaction is supplied to each of the reception terminals using the CD-ROM 300, the program for the approval of the transaction is supplied to each of the approval terminals using the CD-ROM 301 and the program for the telephone call connection control is supplied to the responding terminal 24 using the CD-ROM 302. The recording medium for such programs is not limited to the CD-ROM. Other types of recording media, such as a magnetic disc (e.g., a floppy disc), a magneto optical disc and a magnet tape, can be used to supply the programs to the system.

The telephone transaction support system according to the above embodiments is applied to banking transactions. The present invention is not limited to this. The telephone transaction system according to the present invention can be applied to other types of transactions.

What is claimed is:

1. A telephone transaction support system comprising:
   customer information registration means for registering information regarding a customer in a database, the information including personal information of the customer and information regarding a transaction recorded from a telephone conversation between the customer and an operator;
   feature analyzing means for analyzing a feature of a voice corresponding to a predetermined word obtained in the telephone conversation with the customer; and
   password information registration means for registering information obtained by said feature analyzing means as password information in the database, the password information corresponding to the customer in the database, whereby the information regarding the customer for which the transaction over the telephone should be allowed and the password information for the customer can be registered over the telephone.

2. The telephone transaction support system as claimed in claim 1, wherein the feature of the voice corresponding to the predetermined word includes a voiceprint.

3. A telephone transaction support system comprising:
   customer information registration means for registering information regarding a customer in a database, the information including personal information of the customer and information regarding a transaction recorded from a telephone conversation between the customer and an operator;
   feature analyzing means for analyzing a feature of a voice corresponding to a predetermined word obtained in the telephone conversation with the customer, the feature of the voice including a voiceprint;

a database in which information obtained by said feature analyzing means is stored as password information, the password information corresponding to the customer in said database; and checking means for checking an analyzing result obtained by said feature analyzing means before a transaction is permitted against the password information corresponding to the customer stored in said database, wherein when a checking result that the analyzing result corresponds to the password information is obtained, the telephone transaction with the customer is allowed.

4. The telephone transaction support system as claimed in claim 4, wherein when a plurality number of checking results each of which indicates that the analyzing result does not correspond to the password information are obtained, it is determined that a voice of the customer does not correspond to the voice of a customer for which the password information has been recorded in said database.

5. A telephone call connection control system comprising:

a voice feature database in which voice feature data items representing features of voices of a plurality of operators are stored;

feature analyzing means for analyzing a feature of a voice corresponding to a predetermined word obtained from a customer over a telephone;

operator selecting means for comparing data regarding the feature of the voice of the customer obtained by said feature analyzing means with voice feature data items of respective operators of said plurality of operators in said voice feature database, and for selecting an operator corresponding to a voice feature data item which has a predetermined relationship to the data regarding the feature of the voice of the customer; and connection control means for connecting a call from the customer to a telephone of the operator selected by said operator selecting means.

6. The telephone call connection control system as claimed in claim 5, wherein the voice feature data items representing the features of the voice of the operators and the data regarding the feature of the voice of the customer include data regarding voiceprint.

7. A telephone call connection control system comprising:

a response operator database in which relationships between customers and operators congenial to the respective customers are stored;

retrieval means for retrieving an operator congenial to a customer calling said system, the congenial operator being selected by comparing data regarding a recorded feature of a voice of the customer with recorded voice feature data items of a plurality of operators; and connection control means for connecting a call from the customer to a telephone of the operator retrieved by said retrieval means.

8. A telephone call connection control system comprising:

a voice feature database in which voice feature data items representing features of voices of a plurality of operators are stored;

feature analyzing means for analyzing a feature of a voice corresponding to a predetermined word obtained from a customer over a telephone;

operator selecting means for comparing data regarding the feature of the voice of the customer obtained by said feature analyzing means with voice feature data items of the respective operators in said voice feature database, and for selecting an operator corresponding to a voice feature data item which has a predetermined relationship to the data regarding the feature of the voice of the customer;

response operator registration means for registering the operator selected by said operator selecting means in a response operator database, the operator corresponding to the customer in said response operator database;

retrieval means for retrieving an operator congenial to a customer calling said system; and connection control means for connecting a call from the customer to a telephone of the operator retrieved by said retrieval means.

9. The telephone call connection control system as claimed in claim 8, wherein the voice feature data items representing the features of the voice of the operators and the data regarding the feature of the voice of the customer include data regarding voiceprint.

10. A recording medium which stores a program for a computer to perform a process for supporting a transaction over a telephone, said program comprising:

customer information registration program code means for registering information regarding a customer, recorded from a telephone conversation between the customer and an operator, in a database;

feature analyzing program code means for analyzing a feature of a voice corresponding to a predetermined word obtained in the telephone conversation with the customer; and password information registration program code means for registering information obtained by said feature analyzing means as password information in said database, the password information corresponding to the customer in said database.

11. A recording medium which stores a program for a computer to perform a process for supporting a telephone transaction using a database, information obtained by analyzing a feature of a voice of a customer corresponding to a predetermined word being stored as password information in said database, the password information corresponding to the customer in said database, said program comprising:

feature analyzing program code means for analyzing a feature of a voice corresponding to a predetermined word recorded in a telephone conversation between the customer and an operator; and checking program code means for checking an analyzing result obtained by analyzing a feature of a voice corresponding to the predetermined word obtained in a telephone conversation with a customer before permitting a transaction against the password information corresponding to the customer stored in said database.

12. A recording medium which stores a program for a computer to perform a process for connecting a call from a customer to a telephone of one of a plurality of operators using a voice feature database in which voice feature data items representing features of voices of said plurality of operators are stored, said program comprising:

feature analyzing program code means for analyzing a feature of a voice corresponding to a predetermined word obtained from a customer over a telephone;

operator selecting program code means for comparing data regarding the feature of the voice of the customer obtained in accordance with said feature analyzing program means with voice feature data items of the respective operators in said voice feature database, and for selecting an operator corresponding to a voice feature data item which has a predetermined relationship to the data regarding the feature of the voice of the customer; and connection control program means for connecting a call from the customer to a telephone of the selected operator.

13. A recording medium which stores a program for a computer to perform a process for connecting a call from a customer to a telephone of one of a plurality of operators using a response operator database in which relationships between customers and operators congenial to a respective customer is stored, said program comprising:

retrieval program code means for identifying an operator who is congenial to a customer calling said system, the congenial operator being selected by comparing data regarding a recorded feature of a voice of the customer with recorded voice feature data items of a plurality of operators; and connection control program code means for connecting a call from the customer to a telephone of the identified operator.

14. A recording medium which stores a program for a computer to perform a process for connecting a call from a customer to a telephone of one of a plurality of operators using a voice feature database in which voice feature data items representing features of voices of a plurality of operators are stored, said program comprising:

feature analyzing program code means for analyzing a feature of a voice corresponding to a predetermined word obtained from a customer over a telephone;

operator selecting program code means for comparing data regarding the feature of the voice of the customer obtained by said feature analyzing means with voice feature data items of the respective operators in said voice feature database, and for selecting an operator corresponding to a voice feature data item which has a predetermined relationship to the data regarding the feature of the voice of the customer;

response operator registration program code means for registering the selected operator in a response operator database, the operator corresponding to the customer in said response operator database;

retrieval program code means for identifying an operator who is congenial to a customer calling said system; and connection control program code means for connecting a call from the customer to a telephone of the identified operator.

15. A method for supporting telephone transactions, comprising:

registering information including personal information of a customer and information regarding a transaction, the information being recorded in a telephone conversation between the customer and an operator;

analyzing a predetermined word spoken by the customer; and setting the predetermined word as a password for the customer.

* * * * *

UNITED STATES PATENT AND TRADEMARK OFFICE
CERTIFICATE OF CORRECTION

PATENT NO. : 6,396,919 B1  Page 1 of 1
DATED : May 28, 2002
INVENTOR(S) : Takashi Shimada et al.

It is certified that error appears in the above-identified patent and that said Letters Patent is hereby corrected as shown below:

<u>Title page,</u>
Item [56], References Cited, U.S. PATENT DOCUMENTS, add
-- 4,761,807     Matthews et al.          08/1988 --.

Signed and Sealed this

First Day of October, 2002

Attest:

Attesting Officer

JAMES E. ROGAN
*Director of the United States Patent and Trademark Office*